United States Patent [19]

Despain

[11] Patent Number: 5,579,972

[45] Date of Patent: *Dec. 3, 1996

[54] BICYCLE CARRIER

[76] Inventor: Steven S. Despain, 1171 E. 300 North, Orem, Utah 84057

[*] Notice: The term of this patent shall not extend beyond the expiration date of Pat. No. 5,526,971.

[21] Appl. No.: 388,050

[22] Filed: Feb. 10, 1995

Related U.S. Application Data

[63] Continuation-in-part of Ser. No. 239,418, May 6, 1994.

[51] Int. Cl.$^6$ ........................................... B60R 9/10
[52] U.S. Cl. ..................... 224/506; 224/521; 224/924
[58] Field of Search ........................... 224/519, 521, 224/924, 488, 492, 502, 506, 512, 42.03 B, 42.45 R

[56] References Cited

U.S. PATENT DOCUMENTS

| | | | |
|---|---|---|---|
| 3,225,986 | 12/1965 | Anderson | 224/42.03 B |
| 3,796,333 | 3/1974 | Goldstein | 224/521 X |
| 3,891,132 | 6/1975 | Chandler | 224/42.03 B |
| 3,921,869 | 11/1975 | Rogers . | |
| 4,084,736 | 4/1978 | Jacobs | 224/42.03 B |
| 4,413,761 | 11/1983 | Angel | 224/42.45 R |
| 4,676,414 | 6/1987 | Deguevara . | |
| 4,875,608 | 10/1989 | Graber | 224/42.03 B |
| 4,934,572 | 6/1990 | Bowman et al. . | |
| 4,938,399 | 7/1990 | Hull et al. . | |
| 5,025,932 | 6/1991 | Jay | 211/20 |
| 5,062,560 | 11/1991 | Wasden | 224/328 |
| 5,065,921 | 11/1991 | Mobley | 224/324 |
| 5,067,640 | 11/1991 | Gaskill . | |
| 5,067,641 | 11/1991 | Johnson et al. . | |
| 5,129,559 | 7/1992 | Holliday . | |
| 5,169,042 | 12/1992 | Ching . | |
| 5,269,446 | 12/1993 | Biehn . | |
| 5,330,084 | 7/1994 | Peters . | |
| 5,373,978 | 12/1994 | Buttchen et al. . | |

FOREIGN PATENT DOCUMENTS

| | | |
|---|---|---|
| 3526243A1 | 2/1987 | Germany . |
| 1271776A | 11/1986 | U.S.S.R. . |

OTHER PUBLICATIONS

Thule East, 42 Silvermine Rd., Seymour, Connecticut 06483, Thule Sweden 1993/1994 Catalog (32 pages).
Perterson Racks, P.O. Box 335, Richfield, Utah 84701, Backpacker (4 pages).

(List continued on next page.)

Primary Examiner—Renee S. Luebke
Attorney, Agent, or Firm—A. John Pate; Berne S. Broadbent; Gary D. E. Pierce

[57] ABSTRACT

An apparatus for carrying bicycles on a vehicle includes a trunnion fitted to a receiver or other mount secured to a vehicle. A base extends from the trunnion longitudinally away from the vehicle to carry a post having top and bottom supports extending away for supporting bicycles. One or more trays may extend laterally across the lower support with respect to the base. Each tray may be adapted to support the rear tires of two bicycles. The upper support may be an arm having adjustable blocks for mounting the open (free) ends of the tines of the forks of the bicycles. Each block is slotted to receive and position a skewer passing through a fork. The skewer may be positionable along a length of a block, to adjust to the length of a bicycle. The blocks may be mounted in a different orientation (e.g. upside down) to further adjust for bicycle length. Trays and blocks may be arranged to offset every bicycle from every other bicycle in three dimensions to avoid interference of handlebars and pedals. Additional brackets are attachable to the top support for securing skis, waterskis, snowboards, surf boards, and the like. Such equipment may stand on resilient pads positioned in the trays. The base or trunnion may be adapted to attach an extension, a hitch, a cargo rack or the like. The apparatus may be removed from the vehicle and placed on a support surface to operate as a storage rack. A vise mount secured to the post may removably secure a bicycle vise for holding a bicycle during repair and adjustment.

31 Claims, 11 Drawing Sheets

OTHER PUBLICATIONS

B&S Enterprises, P.O. Box 47031–175, Gardena, California 90247, The Ultimate Bike Rack (2 pages).

Bard Wyers Sports, Inc., 4500 Cherry Creek South Drive, Denver, Colorado 80222, Quik Hitch (2 pages).

ANEW Development, Inc., 1300 NE. 48th Ave., Suite 1300, Hillsboro, Oregon 97124 Draft Master (4 pages).

ANEW Development, Inc., 1300 NE. 48th Ave., Suite 1300, Hillsboro, Oregon 97124, Draft Master Sport Racks (8 pages).

Riteway, Advertisement brochure for Hollywood, Wyers, Allen, Slider, and Saris (2 pages).

BICYCLE CARRIER

RELATED APPLICATIONS

This application is a continuation-in-part of application Ser. No. 08/239,418, filed on May 6, 1994 for DEVICE FOR HOLDING A PLURALITY OF BICYCLES ON THE BACK OF A VEHICLE.

BACKGROUND OF INVENTION

1. The Field of the Invention

This invention relates to carrier racks for mounting on vehicles and, more particularly, to novel systems and methods for carrying bicycles outside a vehicle.

2. The Background Art

Bicycling (cycling) is a common sport among youth and adults alike. Bicycling has become increasingly popular in recent years. A variety of sizes and styles of bicycles appeal to any preference, whether riding around a suburban block, on a cross-country tour, or over rough, off-road, or mountainous terrain.

Many persons who cycle carry their bicycles in or on a vehicle while traveling to a destination some distance from home. The destination may be a recreation spot or a competition field. The distance may be just a few blocks away, miles out of town, many miles to a favorite cycling area, or across states on an extended trip. Carriers abound. One or more bicycles may be carried in a "carrier" or "rack" attached to the vehicle.

For short trips, especially, many carriers are not simple enough or small enough to easily assemble, store, or attach Complex, tangled systems are used with various rack for placing on, removing from, or firmly securing to a vehicle. Many racks are not sufficiently rigid to hold large objects such as bicycles firmly. Many racks do not have rapid securement of the carrier to the vehicle. Many quickly damage paint or glass on a vehicle after a short period of time.

Many overhead racks require specialized mounting hardware at substantial cost, or may require drilling of holes, causing permanent body damage to the vehicle for mounting anchors. Thus, the rack hardware must be permanently installed. Bicycles (or other sporting equipment, tools or whatever is carried) must be lifted high overhead. Also, the entire weight of a bicycle must be supported at a distance from a user while positioning the bicycle on an overhead rack. Dropped bicycles may damage the roof of a vehicle, even if the bicycle simply slips briefly through sweaty hands.

Many racks are not readily loaded with or unloaded of cargo. Moreover, once loaded, many have no structure for holding bicycles from hitting one another or the vehicle. For example, many bumper-mounted carriers leave front forks free to pivot, permitting front wheels to strike one another or the vehicle.

Many carriers holding one or more bicycles close to, but away from, a vehicle have insufficient strength, stiffness, and stability. The bicycles may not be secured at enough points for stability during extended travel over unpaved roads. The bicycles may flex the carrier and break it. The bicycles may work free. The bicycles or the vehicle may be damaged by contact, due to flexure, breakage, or swinging of a bicycle or its components. Damage may vary from having paint rubbed off either the bicycles or the vehicle to bending critical component parts of a bicycle or vehicle.

Moreover, the weight of a carrier is a disadvantage. The heavier the carrier, for a given strength, the less weight-carrying capacity is available for carrying bicycles. Also, a user may not be able to easily handle a heavier carrier, especially if the carrier is bulky.

Many carriers are roof-mounted, and many without ready access to bicycles. Moreover, many carriers interfere with access to the vehicle doors, trunk lid, hood, and the like.

In addition, few racks can carry more than a few bicycles, especially if many passengers or substantial cargo are carried. For example, front wheels may be removed from bicycles placed on a carrier, but the removed wheels are then stored in the vehicle for transport. Racks or wheels may occupy space needed for carrying persons or cargo. Racks may preclude drawing other equipment such as a boat or trailer.

Thus, despite a plethora of mounting systems, the effort, strength, time, complexity, lack of security from loss, damage and theft, the cost, inconvenience, and other limitations facing users serve to limit the use of racks for carrying bicycles and other sporting equipment or cargo.

What is needed is a simple carrier or rack, particularly one adaptable to a receiver mount positioned low on a vehicle, that is easily loaded and unloaded. Access to the vehicle by a user should be convenient, preferably with the carried cargo secured to the rack to reduce motion and associated damage or wear. The rack should be capable of easy mounting and dismounting from the vehicle.

BRIEF SUMMARY AND OBJECTS OF THE INVENTION

In view of the foregoing, it is a primary object of the present invention to provide a rack for securing a variety of sizes and styles of bicycles adapted for various types of riding.

It is another object of the present invention to provide a structure for easily and quickly loading and carrying bicycles on a vehicle while traveling to any destination, conveniently, whether near or far from home.

It is another object of the present invention to provide a carrier simple enough or small enough to easily assemble, store, or attach for use.

It is another object of the present invention to provide a structure without complex members subject to tangling or collapsing unexpectedly when removed from a vehicle.

It is another object of the present invention to provide a rack sufficiently rigid to hold large objects such as bicycles firmly.

It is another object of the present invention to provide rapid securement of the carrier to the vehicle, without damage to paint or glass on a vehicle.

It is another object of the present invention to provide a structure not requiring specialized mounting hardware or body damage to the vehicle.

It is another object of the present invention to provide a structure that does not require equipment to be lifted high overhead, nor require that the weight of a bicycle be supported at more than a forearm's distance from a user.

It is another object of the present invention to provide a structure for holding bicycles from hitting one another or the vehicle.

It is another object of the present invention to provide sufficient strength, stiffness, and stability at enough points for stability during extended travel over unpaved roads.

It is another object of the present invention to provide a means for securing bicycles against working free, contact, flexure, breakage, or swinging.

It is another object of the present invention to provide a carrier having a weight near to that of the objects carried or less, a size that is easily lifted and positioned with respect to a vehicle, and a stable structure when removed from a vehicle.

It is another object of the present invention to provide a carrier permitting access to all vehicle doors, trunk lid, hood, and the like.

It is another object of the present invention to provide a rack adaptable to carry from one to six bicycles or more, and within the projected rear profile of a carrying vehicle such as a pickup or sport utility vehicle.

It is another object of the present invention to provide a rack for carrying bicycles without using space designed for passengers or cargo.

It is another object of the present invention to provide additional cargo space and to permit drawing other equipment such as a boat or trailer.

It is another object of the present invention to provide a rack capable of easy mounting and dismounting from a vehicle.

Accordingly, a carrier or rack for carrying bicycles, sporting equipment, tools or the like may be constructed to have several useful features. A carrier consistent with the invention may be constructed to fit in or over a receiver mounted to a vehicle. The receiver may have longitudinal and lateral directions orthogonal (at right angles) to a transverse direction.

A bicycle may be secured to the carrier. The bicycle may have a frame, a fork rotatably connected at a proximal end to one end of the frame, a front wheel selectively attachable and removable from a distal end of the fork, and a rear wheel rotatably connected to the other end of the frame, The carrier may be adapted to be selectively secured to the receiver mounted to the vehicle. The trunnion may extend longitudinally away from the receiver and be adapted to be selectively attachable to and removable from the receiver. A base may be attached to the trunnion for supporting a force acting on the base, and may be contiguous with the trunnion or an extension of the trunnion. The base may be a separate and distinct structure connected to the trunnion, such as plates or ears for holding a post therebetween. A post may be secured to the base to extend transversely away therefrom. A transverse direction may be upward with respect to the trunnion and base.

A first support may be connected toward one end of the post to extend longitudinally away from the base and post for supporting the frame of the bicycle. A support may be an arm. The bicycle may be oriented to extend laterally away from the first support. The bicycle may be supported by a portion of the frame, the fork, or a wheel. The lateral direction may be a sideways direction with respect to the vehicle and a user seated in the vehicle.

A second support may be secured near another end of the post. The second support may be an arm secured to extend longitudinally away from the post. The second arm may be secured to the bicycle, such as to the fork of the bicycle, for supporting the bicycle. The fork may be received on a skewer through a block attached to the second arm. The fork may extend laterally away from the second arm.

The first support may include a tray secured to extend laterally from the first arm for receiving a wheel of the bicycle. The carrier apparatus may carry several bicycles. Each bicycle may stand on its rear wheel, with its front wheel removed, and the tines of its front fork secured to a block on the second arm. A pair of bicycles may be secured to fit virtually rear-tire-to-rear-tire, a nearly vertical plane being defined by the centerlines of the down tube, top tube and seat tube of each bicycle of the pair.

A pin near the first arm may pivotably connect the post to the base. The plane of the bicycle centerlines may be adjustably tilted about the pin toward the vehicle and secured there to improve the center of gravity, aerodynamics and appearance of the apparatus. The post and arms may also be released to tilt about the pin away from the vehicle, permitting a user to have access to the rear of the vehicle.

Additional pairs of bicycles may be offset from one another in three dimensions, or even rotated within their respective planes, to accommodate handlebars and pedals in a minimum space. Thus six or more bicycles may be fit by pairs into a relatively small space just behind the vehicle.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
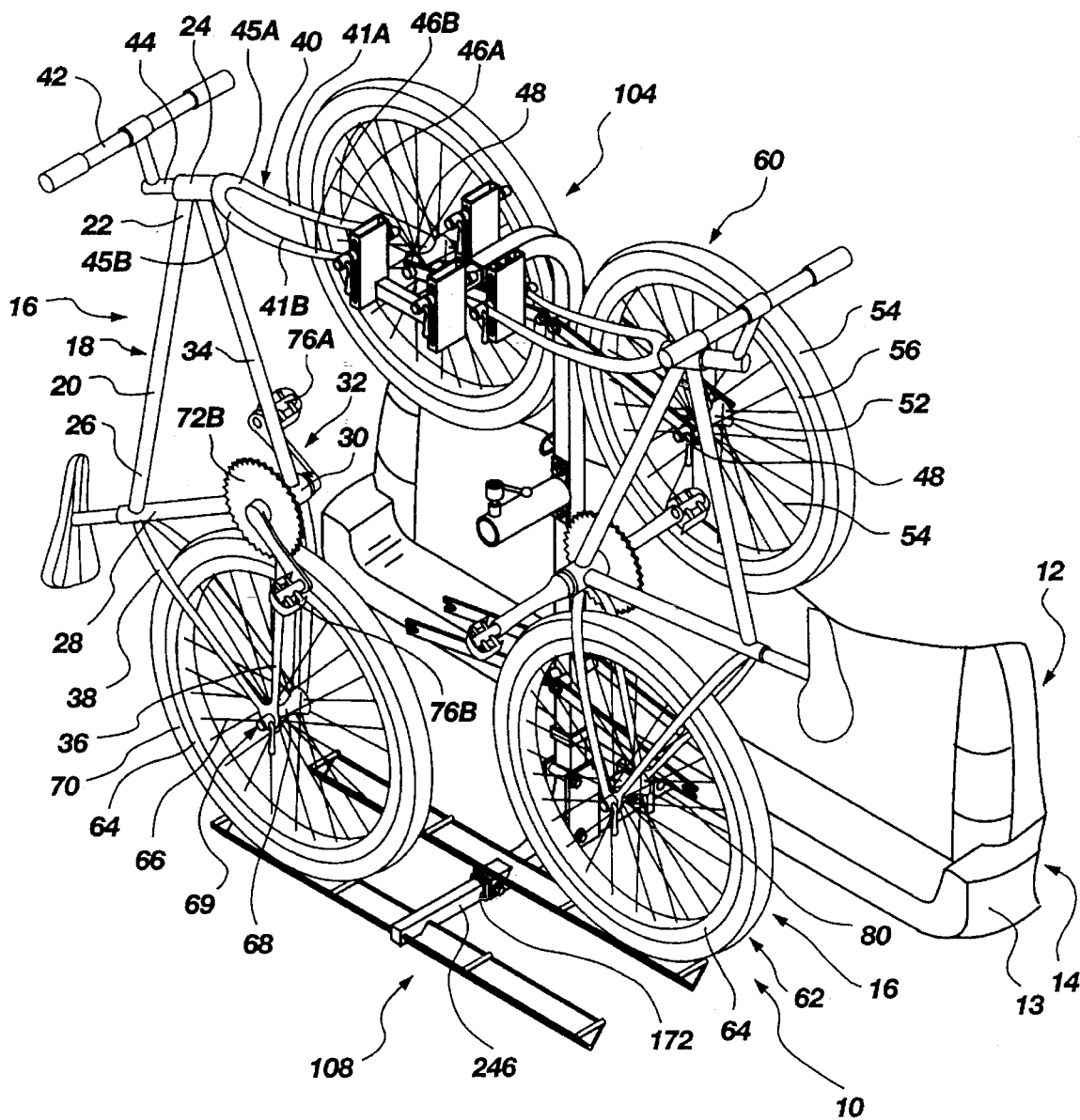
FIG. 1 is an isometric view of one presently preferred embodiment of an apparatus constructed in accordance with the invention, having bicycles attached thereto.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1–21, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

The apparatus is best understood by reference to FIGS. 1–21 and particularly to FIGS. 1–9. The apparatus 10, also referred to as a carrier 10 or rack 10, may be configured to connect to a vehicle 12. The apparatus 10 may be best understood after a description of the vehicle 12 and bicycle 16, between which the apparatus 10 operates.

An apparatus 10 constructed consistent with the invention may be used with a vehicle 12, having a frame 14, which may be of a "unibody" type of formed sheet metal, or a "ladder" type formed as a chassis of structural steel distinct from the body of the vehicle 12. The apparatus 10 may be constructed to support and secure a bicycle 16, and may support up to six or more bicycles 16, in one presently preferred embodiment. The bicycles 16 may be secured by a variety of means connecting at various locations to the structure of the bicycle 16.

Each bicycle 16 may include a frame 18, typically of triangulated construction, for strength and stiffness. The frame 18 may have a top tube 20 secured at one end 22 to the head tube 24 and at another end 26 to a seat tube 28. The seat tube 28 extends from the top tube 20 to the crank housing 30, which contains the crank assembly 32. The crank housing 30 connects to the head tube 24 by the down tube 34 or an equivalent structure, such as a cable, shock mount or the like, as known in the art.

The seat tube 28 triangulates with the chain stays 36 and seat stays 38 fixed to each other and to the seat tube 28, typically by welding.

The fork 40 extends from the handlebars 42, fixedly secured to the head 44, through the head tube 24. The fork 40 comprises tines 41A, 41B connected to the head 44 at their head ends 45A, 45B, respectively. The tines 42A, 42B extend to their respective wheel ends 46A, 46B, between which an axle 48 extends, secured by nuts 49 in slots 50A, 50B. The axle 48 may be removably secured by suitable means. A skewer-type of axle 48 may be a suitable device for quickly releasing from the slots 50A, 50B of the fork 40.

A hub 52 rotates with minimal friction about the axle 48. The hub 52 connects by spokes 54 to a rim 56 surrounded by and carrying a tire 58 to complete the front wheel 60. The rear wheel 62 also includes a rim 64 supported by spokes 66 on a hub 68, rotating about an axle 69. The tire 70 on the rim 64 may be driven by a sprocket 72A (not shown) attached to the hub 68 of the rear wheel 62. Another sprocket 72B rotates as a part of the crank assembly 32, and connects to the sprocket 72A by a chain 74 (not shown). The crank assembly 32 includes pedals 76A, 76B.

A vehicle 12 may be preferably provided with a receiver 80 secured to the frame 14 of the vehicle 12. The receiver 80 may be formed of a tube 82 of any suitable cross section, and preferably of rectangular cross section. The receiver 80 may be formed as a male or female fitting corresponding to a trunnion 90. Apertures 162, 174 may extend through the trunnion 90 and receiver 80, respectively, for receiving a pin 84 to restrain relative movement in a longitudinal direction 86A. A rectangular cross section, or other registration mechanism between the receiver 80 and trunnion 90, may be used to reduce relative motion in a lateral direction 86B, transverse direction 86C, and circumferential direction 86D, with respect to the receiver 80 and vehicle 12.

The receiver 80 may be installed at the rear of a vehicle 12, on the front, or even at the side, depending on the vehicle. In one presently preferred embodiment, the receiver 80 and trunnion 90 extend rearwardly from the rear of the vehicle 12 where a hitch would ordinarily be mounted. Thus, in one preferred embodiment, the lateral direction 86B may extend right or left, the transverse direction 86C, up or down, and longitudinal direction 86A, fore or aft, with respect to person in a vehicle 12 equipped with a receiver 80. The receiver may be a male or female fitting.

Terms such as longitudinally 86A, laterally 86B, transversely 86C, and circumferentially 86D may indicate a direction tending in the respective longitudinal, lateral, transverse, and circumferential directions 86A, 86B, 86C, 86D, respectively. Those terms need not be construed to mean absolute directions along or about the orthogonal axes 86A, 6B, 86C formed at mutual right angles to one another. Rather, those terms may indicate a direction to be tending along the respective axis of the direction 86A, 86B, 86C, 86D and not absolutely parallel to nor along the axis in question.

A collar 88 for reinforcing the receiver 80 may maximize strength while minimizing weight. The collar 88 may be formed on the trunnion 90 if the receiver is a male fitting. That is, the trunnion 80 may be a receiver 90 and vice versa in one embodiment of the apparatus 10. In one preferred embodiment, the receiver 80 on the vehicle 12 may be a female fitting.

An apparatus 10 may be constructed according to the invention to have a trunnion 90 adapted to securely attach to the receiver 80. The trunnion 90 may be attached to a base 100 constructed to receive a post 102. The post 102 may have attached thereto a support 104, which may include a fork mount 106. The fork mount 106 may secure to the tines 42A, 42B. Optionally, additional fork mounts 107 may be added in similar fashion.

A support 108 may also extend from proximate the post 102 and base 100. A tray 110 may be secured to, or as part of, the support 106 for receiving a rear wheel 62 of a bicycle 16. Trays 112 may be added optionally in similar fashion for additional bicycles 16. Tire yokes 116 may be secured to the post 102 for holding front wheels 60 removed from bicycles 16 for transit.

The apparatus 10 may preferably be provided with a tightener 120 for snugging the trunnion 90 to the receiver 80. The tightener 120 may be used to reduce relative motion between the receiver 80 and trunnion 90 in all directions 86A, 86B, 86C, 86D. For additional secondary securement, the apparatus 10 may include a lock anchor 122 for receiving a security cable 124. Though not as well preferred, a similarly functioning structure such as a chain 125 may be used.

The base 100 may be configured in some embodiments to be offset from the trunnion 90. The trunnion 90 may then be open to receive hitch 126 for pulling a trailer. The apparatus 10 may also be provided with a vise 128 receivable in a vise mount 130. The vise 128 may be selectively openable and closeable for conveniently holding a bicycle 16 for repair, adjustment, and maintenance in the field.

The apparatus 10 may be removed from the vehicle 12. For added utility, the base 100 may also be provided with a floor stand 132 for levelling the apparatus 10 on a surface.

The apparatus 10 may optionally be provided with a cargo rack 138 securable to the base 100 or trunnion 90 for supporting and securing additional loads. The cargo rack 138 may be secured in a manner similar to that of the hitch 126 to extend behind the apparatus 10 in a longitudinal direction 86A.

A wing 140 may be secured to the support 104 to extend, preferably, in a lateral direction 86B. Alternatively, a wing 140 could extend in a longitudinal direction 86A or some other direction. The wing 140 may be configured to secure skis, waterskis, snowboards, and other elongate objects such as sporting equipment and tools to be carried in the tray 110 of the apparatus 10.

Returning to FIGS. 1–9, the apparatus 10 may be securable to a receiver 80 mounted to a vehicle 12. In the preferred embodiment, a trunnion 90 of the apparatus 10 may be adapted to be receivable into the receiver 80. In a less preferred embodiment, the trunnion 90 may fit over the receiver 80. The trunnion 90 may preferably be formed of sturdy, rectangular, tubular, steel stock to have a proximal end 152 fittable into an aperture 154 of the receiver 80.

An end 156 of the trunnion 90 extends longitudinally 86A from the receiver 80. A suitable wall thickness 158 may be selected for the trunnion 90 and a riser 160 extending transversely 86C, preferably upwardly, away from the trunnion 90. The trunnion 90 and riser 160 may be formed of solid material, but can be formed to be of suitable strength from hollow tubing stock. The cross section of tubing selected for the trunnion 90 may preferably be rectangular, although other cross sections, such as circular, oval, diamond, and the like, can be made to operate serviceably.

An aperture 162 may be formed in the trunnion 90 near the end 152 for securing the trunnion 90 in the receiver 80 by pin 84. In some embodiments illustrated, a pin 85 through the apertures 163, 175, may support the drawing load (force) applied in the longitudinal direction 86A by the optional hitch 126. The trunnion 90 supports forces in the transverse and lateral directions 86B, 86C.

The riser 160 may be formed of a section of tubing welded or otherwise secured by suitable fastening means to extend transversely 86C (e.g. upwardly) from the trunnion 90. The riser 160 may form a portion of the trunnion 90 or base 100. The riser 160 may be formed by bending the trunnion 90 or base 100, or by fastening tubing or plates to the trunnion 90 or base 100.

The base 100 may be a continuous extension of the material of trunnion 90. In some presently preferred, to alternative embodiments, the base 100 may be formed to secure to a trunnion 90 fittable into a receiver 80 mounted under the front or rear bumper 13 of the vehicle 12. The base may be mounted to the frame of the vehicle 12 without a receiver 80 in at least one embodiment.

In one presently preferred embodiment, the base 100 may be formed to have a bottom tube 164 having a proximal end 166 extending from the trunnion 90 portion of the apparatus 10. The bottom tube 164 may extend to a distal end 168 and have a width 170A, and wall thickness 170B defining a passage 172 extending between the ends 166, 168. Apertures 175 and 163 may be provided for receiving a pin 85. A riser 160 may be secured to the bottom tube 164 to extend transversely 86C.

Plates 178 may be welded, bolted, riveted or similarly fastened to the riser 160, but may be secured directly to the bottom tube 164 to extend transversely 86C away. Each plate 178 may be provided with a pivot aperture 180, a biased pivot aperture 182, a lock aperture 184, and an anchor aperture 186. The pivot aperture 180 and biased pivot aperture 182 may be sized to receive a pivot pin 188.

The post 102 may be pivotably supported by the pivot pin 188. The pivot pin 188 may be placed through the pivot apertures 180 to orient the post 102 in a transverse direction, such as a more or less vertical position, with respect to the vehicle 12. Alternatively, the pivot pin 188 may be placed through the biased pivot apertures 182 to tilt the post 102 about the lock pin 190 toward the vehicle 12. Tilting the post 102 shifts the weight of the apparatus 10 and the bicycles 16 on it, moving the center of gravity toward the vehicle. The result is a more nearly balanced loading on the receiver 80, trunnion 90, and post 102.

The post 102 may be also restrained by a lock pin 190 which may pass through the lock apertures 184. The lock pin 190 may pass beside the post 102, through the post 102, or be otherwise captured against the post 102 for supporting the post 102 between the plates 178.

An anchor pin 192 may pass through the anchor apertures 186. When the lock pin 190 is removed, the post 102 may be tilted about the pivot pin 188 away from the anchor pin 192. The anchor pin 192 secures a tether 194 to the plates 178. The tether 194 prevents the post 102 from tilting away from the anchor pin 192 too far upon removal of the lock pin 190. The tether may have loops 196A, 196B for receiving the anchor pin 192, and a tether pin 198, respectively. The tether 194 may, for example, be formed of nylon webbing, chain, cable or other strong, flexible material. A mechanical linkage such as a sliding bar or folding bar having a stop for limiting relative motion between the post 102 and base 100 may also be used.

The post 102 may be fixed to the base 100 and the trunnion 90. In one presently preferred embodiment, the post 102 may be fastened to a pivot sleeve 200 near one end 202, by a suitable means such as welding for receiving the pivot pin 188. Another end 204 extends transversely away from the base 100. Between the two ends 202, 204 a lock sleeve 206 may be attached to the post 102 for receiving the lock pin. With the pivot pin 188 through the pivot sleeve 200 and the plates 178 the post 10 may be positioned by the one end 202. With the lock pin 184 also through the plates 178 and the lock sleeve 206 the post 102 may be fixed.

A tether yoke 208, formed to receive the tether pin 196 through yoke apertures 210, may be secured to the post 102 for receiving the tether loop 196A. Upon release of the lock pin 190 and tilting of the post 102 away from the vehicle 12, a user may gain access to the vehicle 12. The tether 194 extends between the anchor pin 192 and tether pin 196 to limit the tilting of the post 102.

Referring to FIG. 4 and 7–9, the post 102 may be mounted to alternative bases 100. For example, a carrier 10 may be secured to mounting bolts 214 (tire rack) extending from a position on the vehicle 12 for carrying a spare tire. (See, e.g. FIG. 4) The carrier 10 may have a bracket 216 formed of a plate 218 perforated to receive the mounting bolts 214. Thus, a spare tire could fit in front of or behind the plate 218 placed over the mounting bolts 214. Mounting the tire 223B after the bracket 216 may make the spare tire 223B more easily accessible. The spare tire may be secured on the mounting bolts 214 extending through the plate 218. The bolts 214 may conveniently extend from the vehicle 12, but may also extend to the vehicle 12 as illustrated.

The bracket 216 may include a standoff 220 secured to the plate 218, for example, by welding, bolting, riveting, integral forming or the like. The standoff 220 may have a length 222 extending beyond any obstruction. The standoff 220 extends through the center of the wheel 223A of a spare tire 223B, and may be formed of tubular material to have a passage 224 for receiving a trunnion 226 on a mated bracket 228. The trunnion 226 may be selectively secured to the standoff 220 by a suitable means such as bolting, clamping, pinning or the like. The bracket 228 may be formed to have a trunnion 226 attachable to the standoff 220 by bolts 227 through apertures 229. A plate 230 having apertures 229, 232 may be fastened, for example by welding, to the trunnion 226.

The apertures 232 may be spaced apart at a universal spacing 234, or other suitable distance. The universal spacing 234 may be selected and used at many locations on the apparatus 10 where fastening may be done, to assure ease of assembly, minimum manufacturing cost, and interchangeability of components when advantageous.

The bracket 228 secures the post 102 to the vehicle 12 when the post 102 may be secured to the plate 230, and the trunnion 226 may be secured to the standoff 220. The matching apertures 236 in a base 100 or a post 102 may receive bolts 238 passed through the apertures 232 of the plate 230. For strength and stability, the plate 230 may be further provided with a U-bolt 240 or other suitable fastener for securement to the post 102 or base 100. The apparatus 10 may be selectively removed from the vehicle 12 upon removal of the trunnion 226 from the standoff 220.

Alternatively, the bracket 216 connected to the standoff 220 may be fastened to a bracket (not shown) secured directly to the mounted spare tire, such as by clamping. Similarly, a plate or clamp could be formed into a bumper 13 mount securable to a bumper of the vehicle 12. The bumper mount may be bolted, welded or otherwise fastened to the bracket 216 to carry the apparatus 10. Similarly, the receiver 80, trunnion 90, bracket 216, or standoff 220 could be attached directly to a suitable location on the vehicle 12, such as on the frame 14.

In one presently preferred embodiment, the receiver 80 attached to a vehicle 12 may be a suitable mounting location for a trunnion 90 to support the base 100 of the apparatus 10. A base 100 may be oriented with a longitudinal direction 86A extending from the front, rear or side of a vehicle 12, depending on the size and construction of the vehicle 12.

Figure 8:
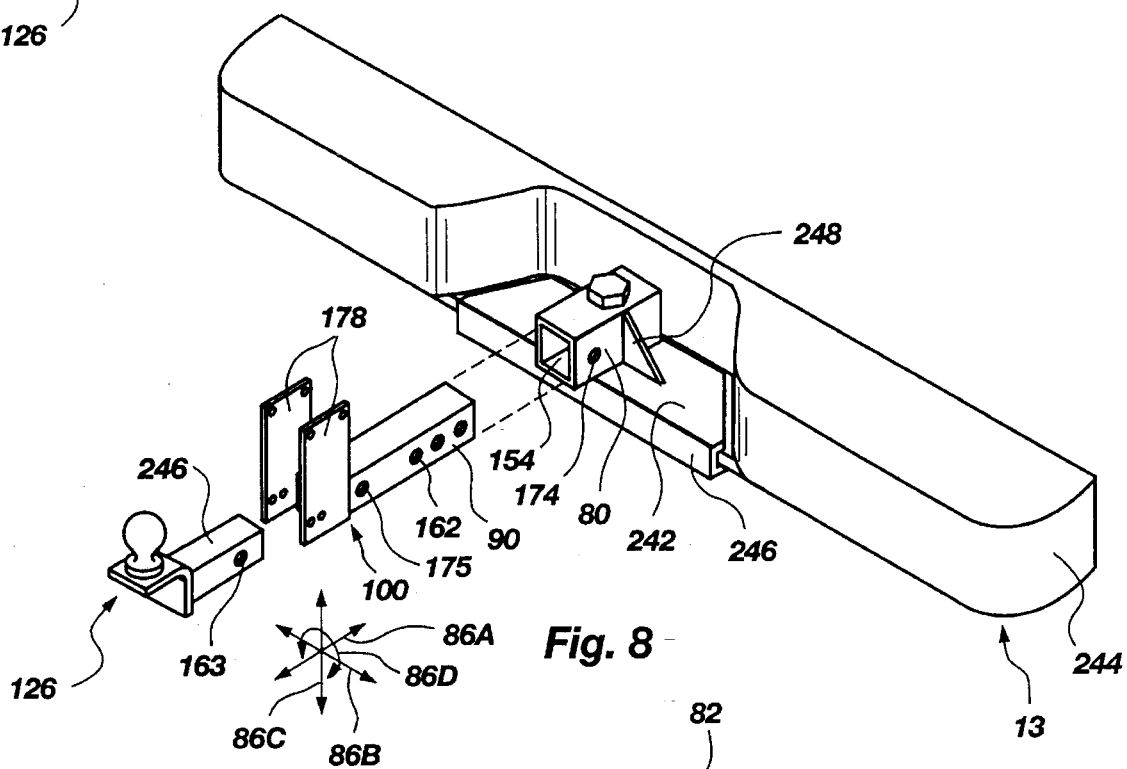
FIG. 8 is an isometric view of an alternate embodiment for a base and receiver for the apparatus of FIG. 1.
Figure 9:
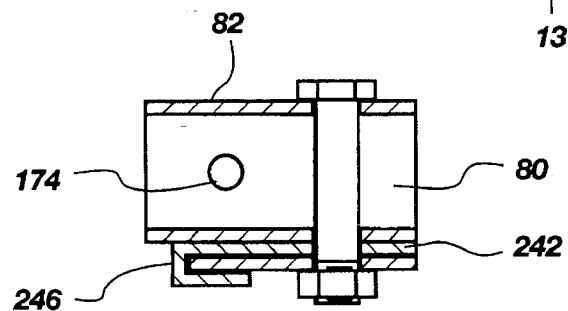
FIG. 9 is a sectioned, side elevation view of a detail of the receiver of the apparatus of FIG. 9.
Figure 10:
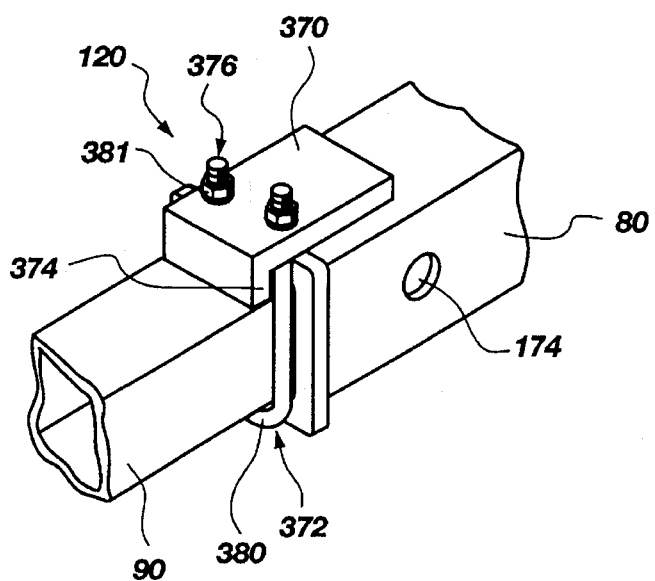
FIG. 10 is an isometric view of one embodiment of an apparatus for reducing wobbling of an apparatus made in accordance with the invention.

Referring to FIGS. 8–9, in one alternate embodiment, a receiver 80 may be formed on a bottom plate 242 adapted to fit on a heavy-duty type of vehicle bumper 244 made to receive a ball hitch (not shown). The plate 242 may be provided with a lip 245 for orienting or registering the plate 242 with respect to the bumper 244. Plates 178 may be secured to the plate 242 and may be stabilized with suitable bracing 248. The base 100 may be bolted in place of a ball hitch on the bumper 244. The post 102 may be tiltably secured between the plates 178 as with other bases 100 described.

All bases 100 may be formed to be extendable by addition of extensions 246 securable to the base 100. For example, the passage 172 may be sized to receive an extension 246. A pin 85 through the aperture 175 may secure the extension 246 to the tube 164 of the base 100. Alternatively, extensions 246 may be formed to extend from the support 108 (such as from the arm 109) attached to the post 102. The passage 172 may also be shimmed to receive a hitch 126. This may be particularly useful when the receiver 80 is occupied by the trunnion 90 of the apparatus 10, but a user desires to pull a trailer.

Referring to FIGS. 1–6, the supports 104, 108 may be attached to the post 102 to support one or more bicycles 16. The supports 104, 108 may include arms 105, 109, respectively, extending longitudinally 86A away from the post 102. The support 104 may be configured as a fork mount 107 comprising a block 250, as in FIG. 6, attachable to the arm 105 for receiving a skewer 252. The fork mount 106 may be extended by an extension 107 constructed similarly to the fork mount 106. That is, the fork mount 106 may fit into the support 104 as the extension 246 fits into the base 100 or support 108.

The block 250 may be formed of tubular stock of rectangular cross section extending transversely 86C upwardly 251A. The width 256, thickness, 258, length 260, wall thickness 261, and material of the block 250 may be selected to result in suitable strength to handle the dynamic load of a bicycle 16 suspended from the block 250. The block 250 may be sized to fit between the tines 42A, 42B of the bicycle 16. The block 250 may be fabricated from a solid block of material, but suitable weight and strength may be achieved using the tubular stock.

Apertures 262 may be formed in the block 250 to be round or slotted in shape. In a presently preferred embodiment, the apertures 262 may be spaced apart a universal spacing 234. With a slotted embodiment of apertures 262, the block 250 may be removed by loosening the bolts 263 rather than removing them. The block 250 may be upended and re-secured to extend transversely 86C downwardly 251B to accommodate a smaller bicycle 16 than one accommodated by the block 250 when extending upwardly 251A.

Slots 264A, 264B may be formed in each block 250 for receiving a skewer 252. The slots 264A, 264B may be formed to have a length 268A suitable for adjusting the position of the skewer 252 for the length of a bicycle 16.

Spacers 270A, 270B ride on ways 271A, 271B formed in the block 250 by cutting the slots 264A, 264B. Each spacer 270A, 270B may be provided with a body 272 having shoulders 274A, 274B dropping off to a pilot 276 and axle stub 278, respectively. A skewer 252 passing through (skewering) the spacers 270A, 270B captures each, retaining the pilots 276 in the slots 264A, 264B to ride against the associated ways 271A, 271B.

A bicycle 16 may be brought to have its top tube 20 oriented generally with the post 102, the seat tube 28 extending laterally 86B away from the crank housing 30 to the top tube 20. The wheel ends 46A, 46B of the tines 42A, 42B may then be positionable astraddle of the block 250, including the spacers 270A, 270B. The axle stub 278 of each of the spacers 270A, 270B may then be received into the axle slot 50A, 50B of the respective tines 42A, 42B. The tines 42A, 42B may be received over the spacers 270A, 270B.

A camlock 281 may be rotated to tighten a nut 283 on the skewer 252. The nut 283 may be adjusted as necessary before the camlock 280 is rotated, in order to receive and secure the tines 42A, 42B more easily. Different types and sizes of skewers 252 may be used. The shoulders 274A, 274B, pilot 276, and axle stub 278 may not be required when using some large (e.g. nine millimeter diameter) skewers 252 closely resembling an axle. However, a skewer 252 having a spring 266 pressing against the block 250, to create friction therebetween, has been found to stay positioned at any selected location along the ways 271A, 271B for easier loading and securement of the bicycles 16 for people with only two hands. Alternatively, the spring 266 may be embodied as the spring 267 connected to pull the spacers 270A, 270B against the block 250 for creating friction.

In alternative embodiments, a skewer may have a spring 266 connected between the spacers 270A, 270B to either push apart, or draw the spacers 270A, 270B together, with respect to the block 250. The spring 266 (e.g. inside the block 250, pulling the spacers 270A, 270B), or springs 266 (e.g. outside the block 250, pushing spacers 270A, 270B from the block 250) may be selected to produce sufficient friction between the block 250 an the spacers 270A, 270B to hold the skewer 252 against gravity. Tension of the spring 266 may be selected to allow a user to adjust the position of the skewer 252 along the ways 271A, 271B.

An extended fork mount 107 may be formed to have an extension 280 with a spreader 282 for supporting blocks 250. The length 284 of the extension 280, length 286 of the spreader 282, and the relative distance 288 between the extension 280 and the support 108 below the bicycle 16 may be selected to facilitate loading bicycles 16 in close proximity without interference by handlebars 42, crank assemblies 32 (particularly pedals 76A, 76B) on adjacent bicycles 16, 17.

Referring to FIGS. 11–15, the support 104 may be designed in alternative embodiments to include a hanger 290 (instead of a tray 110) for securing to a part of the frame 14 of the bicycle 16. For example, a hanger 290 may include a finger 291 extending from the arm 109, arm 105 or the post 102. The finger 291 may extend from some other member extending from the finger to the post 102 or arm 105, 109. The finger 291 may be long, short, straight, bent, curved or multi-pieced to provide support from the post 102 to the bicycle 16. Also, a hanger 290 may be rigidly attached, adjustably attached to be positioned rigidly at a desired position, or may be pivotably attached to fit an angle required by the specific bicycle 16 positioned thereon.

The hanger 290 may be securably closeable, or may simply hang the bicycle by a part of the frame 18. The hanger 290 may be configured to extend laterally away from the arm 109, 105 to wrap in a suitable direction around the top tube 20, head tube 24, down tube 34 or fork 40. The bicycle 16 may be suspended with the wheel ends 46A, 46B of the tines 42A, 42B of laterally 86B adjacent bicycles 16 extending towards one another or away from one another.

In one embodiment with the wheel ends 46A, 46B of laterally adjacent bicycles positioned away from one another, for example, a hanger 290 may be configured as a tube formed to fit inside the down tube 28 of the bicycle 16, replacing the seat post. Thus, upon removal of the seat from the down tube 28, a user may place the bicycle 16 on such a hanger 290 extending from the support 108. The handlebars 42 may be connected by another suitable embodiment of a hanger 290 to the support 104.

Similarly, the supports 104, 108 may be configured to support a bicycle 16 by the fork 40 and another portion of the frame 18. In some embodiments, a hanger 290 may extend away from an arm 109 or post 102 to hold the bicycle 16. If bicycles 16 are arranged with tines 42A, 42B toward the arm 105, or arm 109 and top tubes 20 away from the arm 105, 109, the hanger 290 may be padded and configured to conveniently support, grasp, or hang each bicycle 16 by the seat tube 28, down tube 34, crank housing 30, or chain stays 36, or similar structures.

If bicycles 16 are arranged with tines 42A, 42B away from the arm 105, 109 and top tubes toward the arm 109, the hanger 290 could be configured to conveniently grasp or hang each bicycle 16 by the top tube 20, seat tube 38, down tube 34, seat stays 38, rear axle 69, or rear tire 70. All of these clamping and hanging embodiments are within contemplation, FIGS. 4, and 11–15 illustrating some few examples thereof.

Figure 11:
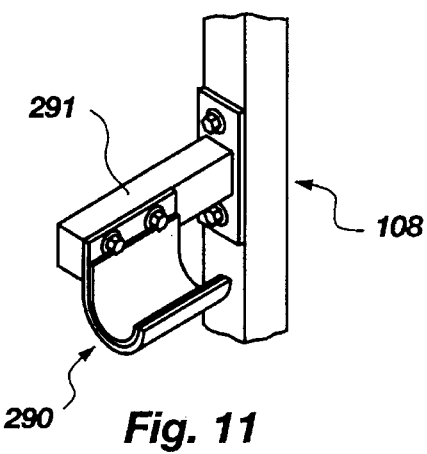
FIGS. 11–15 are isometric views of alternative embodiments of support members for use with the apparatus of FIGS. 1–5.
Figure 12:
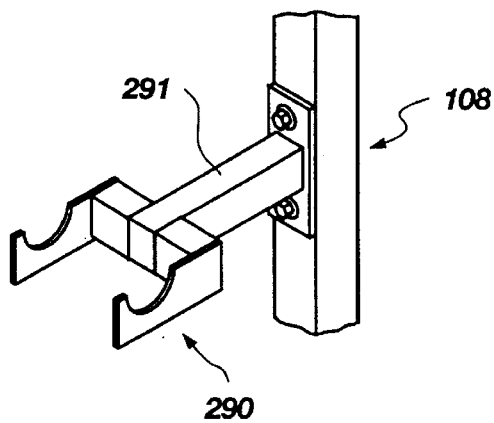
Figure 13:
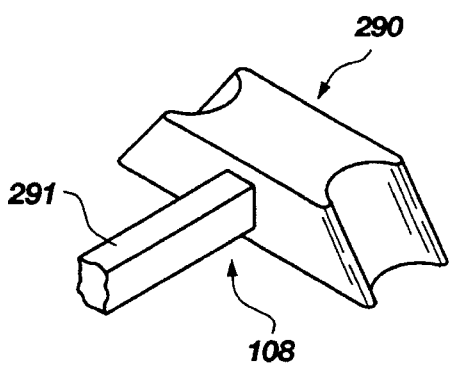
Figure 14:
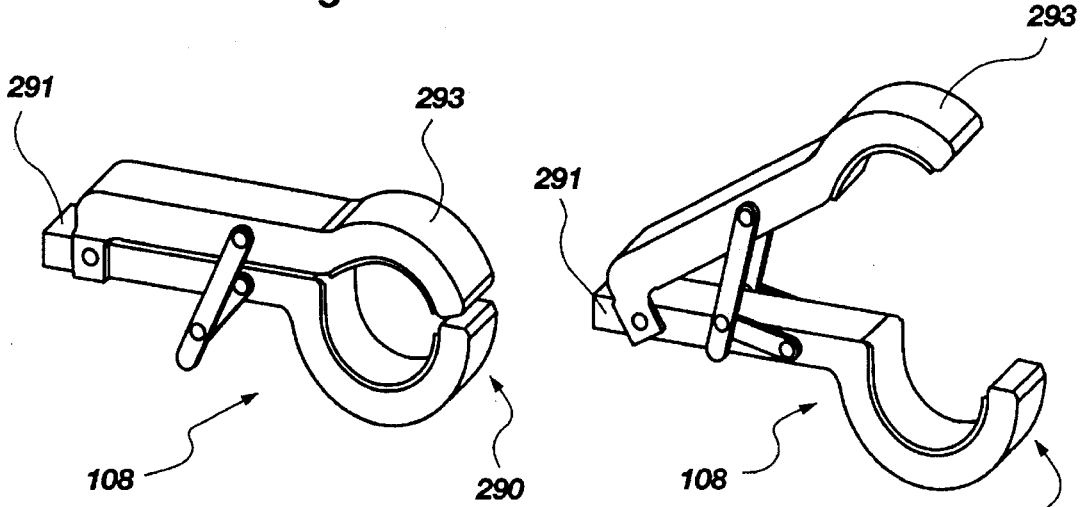
Figure 15:
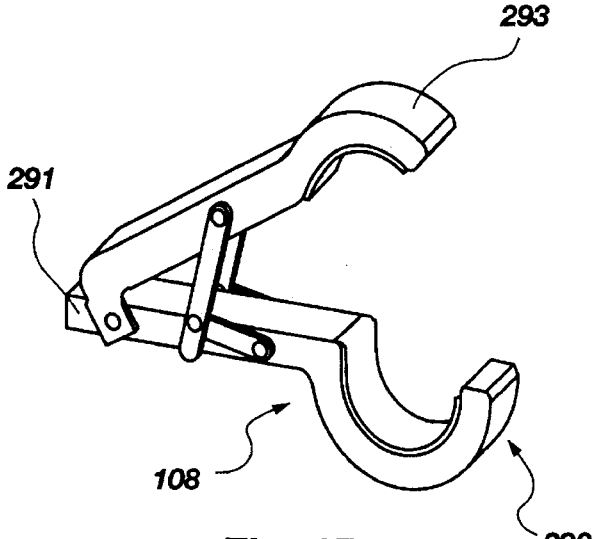
Figure 16:
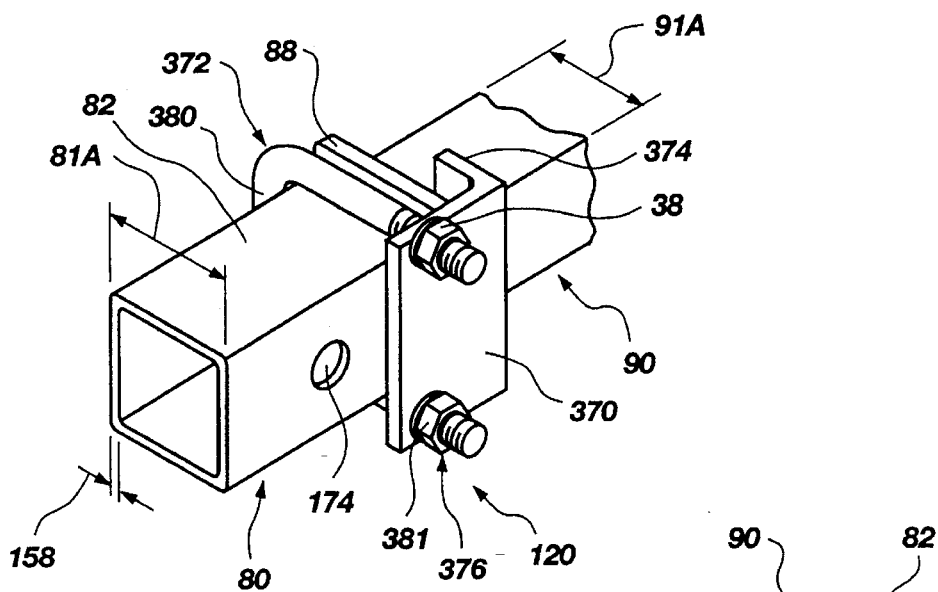
FIGS. 16–19 are isometric views of alternative embodiments of the apparatus of FIG. 10.
Figure 17:
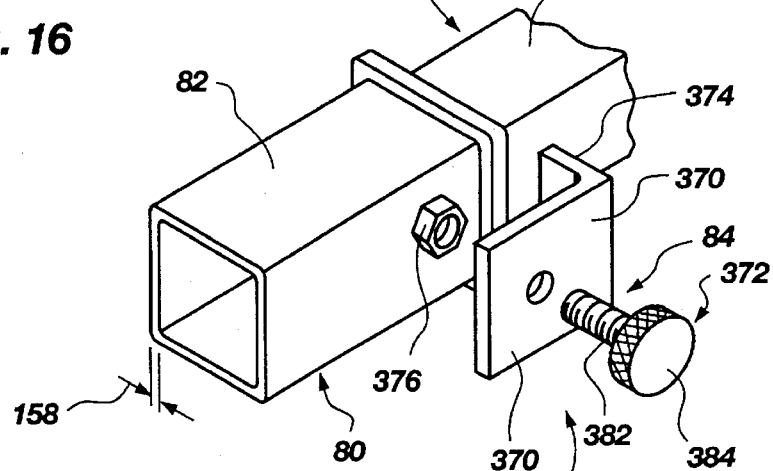
Figure 18:
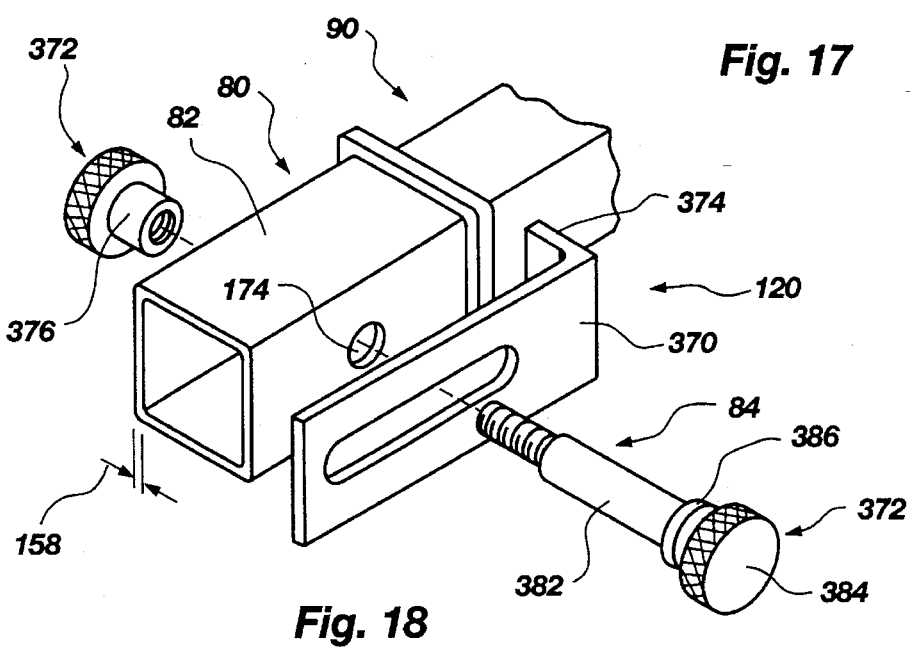
Figure 19:
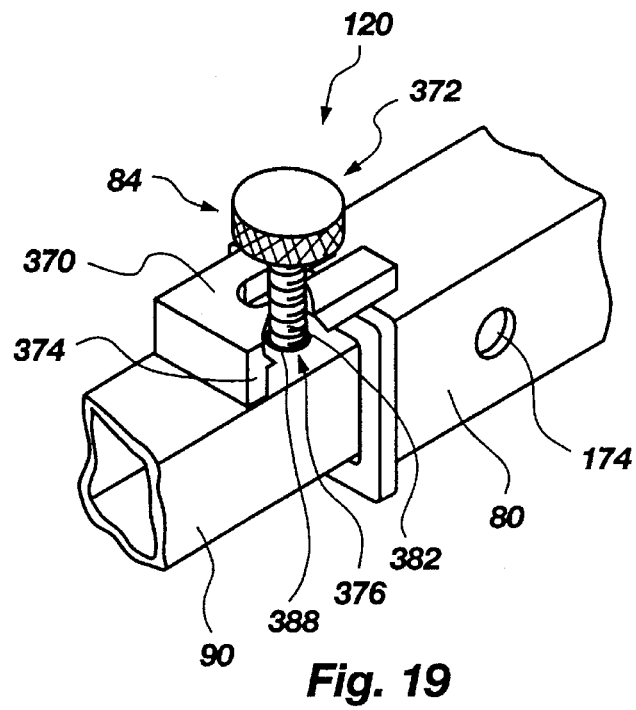

A hanger 290 may be adapted to hang any tube 20, 24, 28, 34 of a bicycle 16 by suitable orientation and sizing (see e.g. FIGS. 11, 14, 15). Likewise, a hanger 290 may be adapted to support a bicycle 16 by fitting under the crank housing 30 (see FIG. 12), or where two of the tubes 20, 24, 28, 34 intersect (see e.g. FIG. 13). The hanger 290 of FIG. 13 may be formed of a resilient material supported on a finger 291 to carry a bicycle by two of the tubes 20, 24, 28, 34. The finger 291 may be of suitable construction to reach from, for example, the arm 109 or post 102 to the hanger 290 without interfering with the bicycle 16.

Suitable locations on the bicycle 16 may be selected for hanging or for grasping by a hanger 290 having a clamp 293 as illustrated in FIGS. 14–15. Each hanger 290 may be suitably cushioned in any embodiment, as needed, to protect a bicycle from damage during loading or transporting.

Touching the bicycle 16 may wear or scratch the finish, interfere with cables, and damage other small components. One presently preferred embodiment of the apparatus 10 supports the rear wheel 62 of each bicycle in a tray 110 secured to the support 108. The tray 110 may be attached to extend laterally 86B from the arm 109. The arm 109 may extend longitudinally 86A from the post 102 or the base 100.

That is, a stronger apparatus 10 having lighter weight may result from an embodiment in which the arm 109 extends directly from the base 100 to which it attaches. In such an embodiment, the post 102 may be pivotably attached to the base 100 while the arm 109 may be rigidly secured to the base 100. Alternatively, the arm 109 may be integral with the post 102, even to the extent of both being bent from a single piece of tubing.

In one currently preferred embodiment of the apparatus 10, the arm 109 and post 102 may be rigidly connected together. The post 102 and arm 109 may then be pivotable together, with respect to the base 100, at the end 202 of the post 102. Upon release of the lock pin 190, the post 102 may be tilted on the pivot pin 188 away from the vehicle 12 with all the bicycles 16 secured to the apparatus 10.

The support 108 may be configured in one embodiment with an arm 109 extending from the post 102. The arm 109 may be formed by bending the post near the end 204 to form the arm 109 connected to the post 102. Alternatively, the arm 109 may be fastened, by means such as welding, riveting, threading or bolting, to extend longitudinally 86A away from the post 102. The arm 109 may have a length 302 extending between the ends 304, 306.

Near the end 306 of the arm 109, a tray 110 may be secured to extend laterally 86B away from the arm 109. The tray 110 may be embodied to extend in distinct halves, but may be formed as a single piece cut and fitted to the arm 109. The tray 110 may be formed of a material such as angle iron or channel iron. A length 308 may be selected to extend to at least under the axle 69 of the rear wheel 62 of each bicycle 16 positioned in the tray 110. The tray 110 may be mounted directly to the arm 109 by welding or other permanent method. Alternatively, a bracket 310 may be formed to fit over the arm 109. The tray 110 may be permanently secured to the bracket 310. The bracket may then be removably secured to the arm 109, such as by bolts 312 at a universal spacing 234.

The tray 110 may be formed to have a width 314, and depth 316 for conveniently receiving the rear tire 70 of a bicycle 16. Braces 318 may be placed to support the trays 110 and to resist rolling by the tires 70 during loading and unloading. The tray 110 may also serve as a skid plate to prevent damage to the wheel 62 when the vehicle 12 "bottoms out" in rough terrain.

The tires 70 may be secured to the tray 110 with a strap 320 or other restraining mechanism effective to prevent rolling or bouncing by the tire 70 during transit. In this embodiment, the bicycle 16 may form a structural link between the tray 110 of the support 108, and the block 250 of the support 104. Thus, the post 102, tray 100, and bicycle 16 triangulate to strengthen and stiffen the apparatus 10. Thus, lighter weight may be achieved while maintaining suitable strength and stiffness of the apparatus 10.

The ends 304, 306 of the tray 110 may be left open to form drains 322 to let water run out after loading or after washing. The drains 322 may serve another function to provide access to the tray 110 by a user for installing pads 324. That is, the apparatus 10 may be configured to carry tools or sporting equipment such as skis, ski poles, snowboards, waterskis, surfboards and the like. However, structurally strong materials suitable for forming the tray 110 may be harder than desired for hauling. For example, jostling and bouncing of sporting equipment in the tray 110 during transit may damage the equipment such as by chipping, chafing, cutting or breaking. A pad 324 may be formed of an impact-absorbing material such as a resilient, elastomeric or polymeric material. The pad may be sized to slide into the tray 110 at an end 304, 306 through the drain 322 and under the braces 318. Thus, the braces 318 secure the pad 324 in the tray.

Other trays 112 may be constructed similarly or identically to the tray 110, but offset transversely 86C to save space between bicycles 16. Additional improvements in performance may be obtained by forming an extension 330 sized to fit the arm 109. The extension may be formed to be secured by a pin 332 (not shown) similarly to the securement method of the trunnion 90, or by bolts 312 at the universal spacing 234. The bolts 312 may be identical to the bolts 312 securing the bracket 310 of the tray 110 to the arm 109.

Each tray 110, 112 may be offset transversely 86C a distance 336. One benefit of the distance 336, is to allow for the rotation of the forks 40 of bicycles 16 on the tray 112. The axle ends 46A, 46B move transversely 86C upon rotation laterally 86B with the spreader 282. To adjust for this change of position, the tray 112 may benefit from being positioned transversely 86C a distance 336. A broader range of positions along the ways 271A, 271B of the block 250 on the fork mount extension 109 may then remain available to a user for securing a fork 40.

A shim 338 may be formed to size a passage 334 in the arm 109 to receive the extension 330 or a hitch 126. Caps 340 may be used to close openings such as the passage 334 from weather and insects when not in use.

When the fork 40 of a bicycle 16 is secured to the apparatus 10 by a skewer 152 through the axle slots 50A, 50B, the front wheel 60 must be removed. Storage of the front wheel 60 during transit may present an inconvenience, particularly since it may be wet or muddy. To carry the front wheels 60, a tire yoke 116 may be secured to the post 102. A tire yoke 116 may be formed of two bars 350A, 350B having a cross direction 351A and axial direction 351B. The bars 350A, 350B may be pivotably secured to the post 102 by a bolt 352. Thus, the yoke 116 may swing transversely 86C to move any size of wheel 60, 62 to the post 102. The tire yoke 116 may also be folded away when not in use.

Spacers 354A, 354B may be provided on the bolt 352 between the bars 350A, 350B. The spacers 354A, 354B may be sized to space the bars 350A, 350B apart to fit the front axle 48 of the bicycle 16, since the hub 52 may be wider than the post 102, rim 56 or tire 58.

Figure 2:
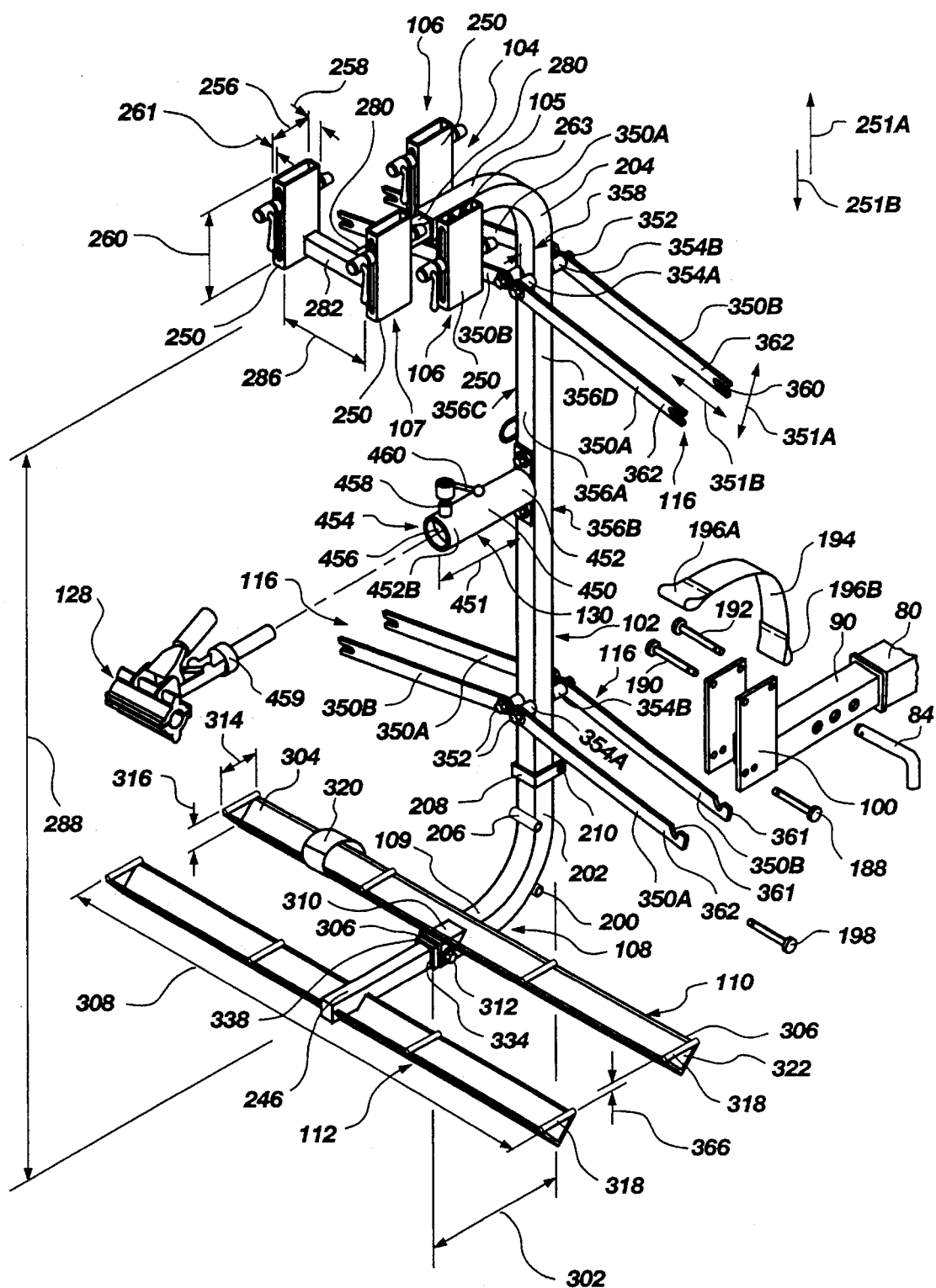
FIG. 2 is an isometric view of the apparatus of FIG. 1, without bicycles attached thereto.
Figure 5:
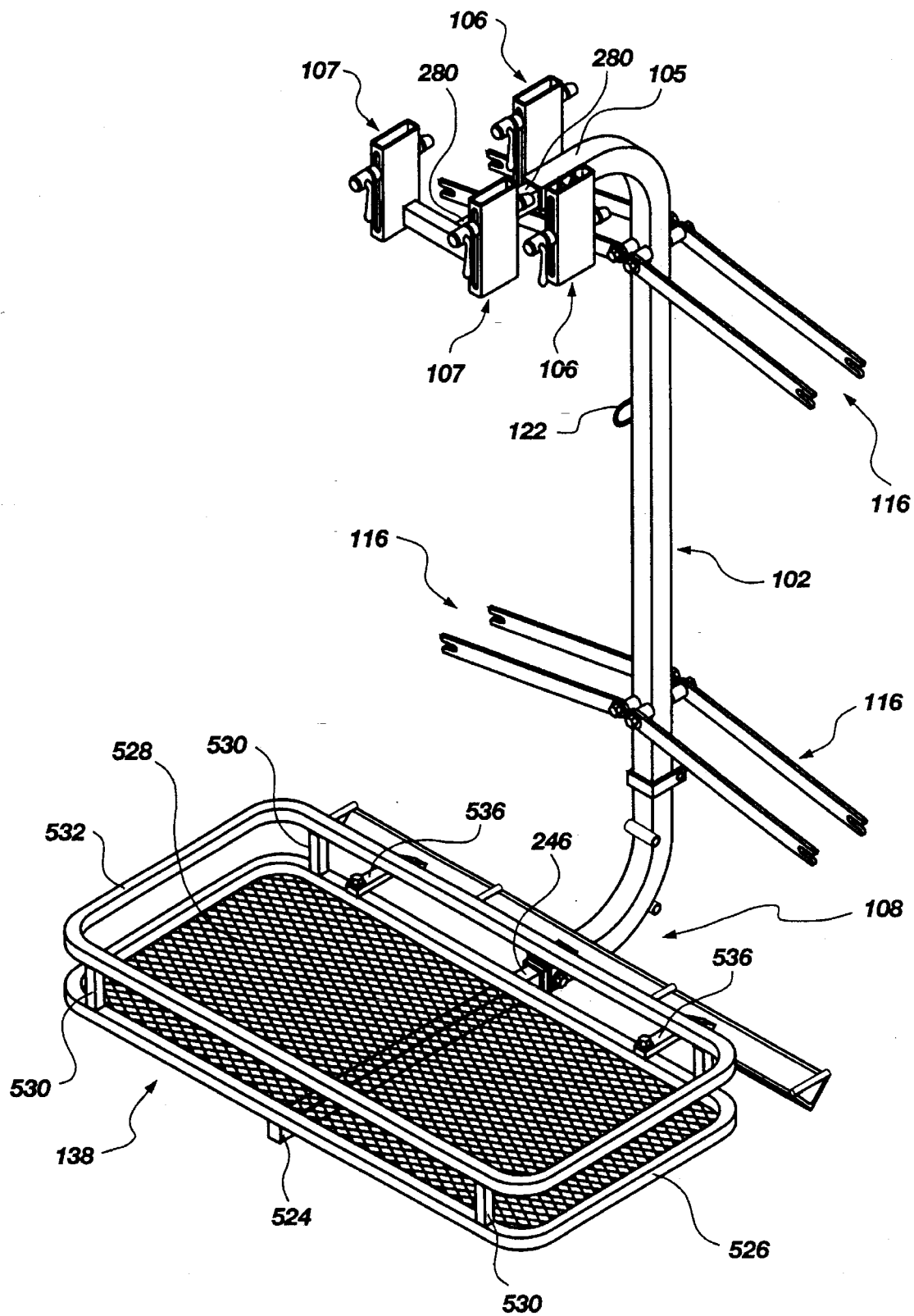
FIG. 5 is an isometric view of the apparatus of FIG. 1 adapted to hold a cargo rack.
Figure 6:
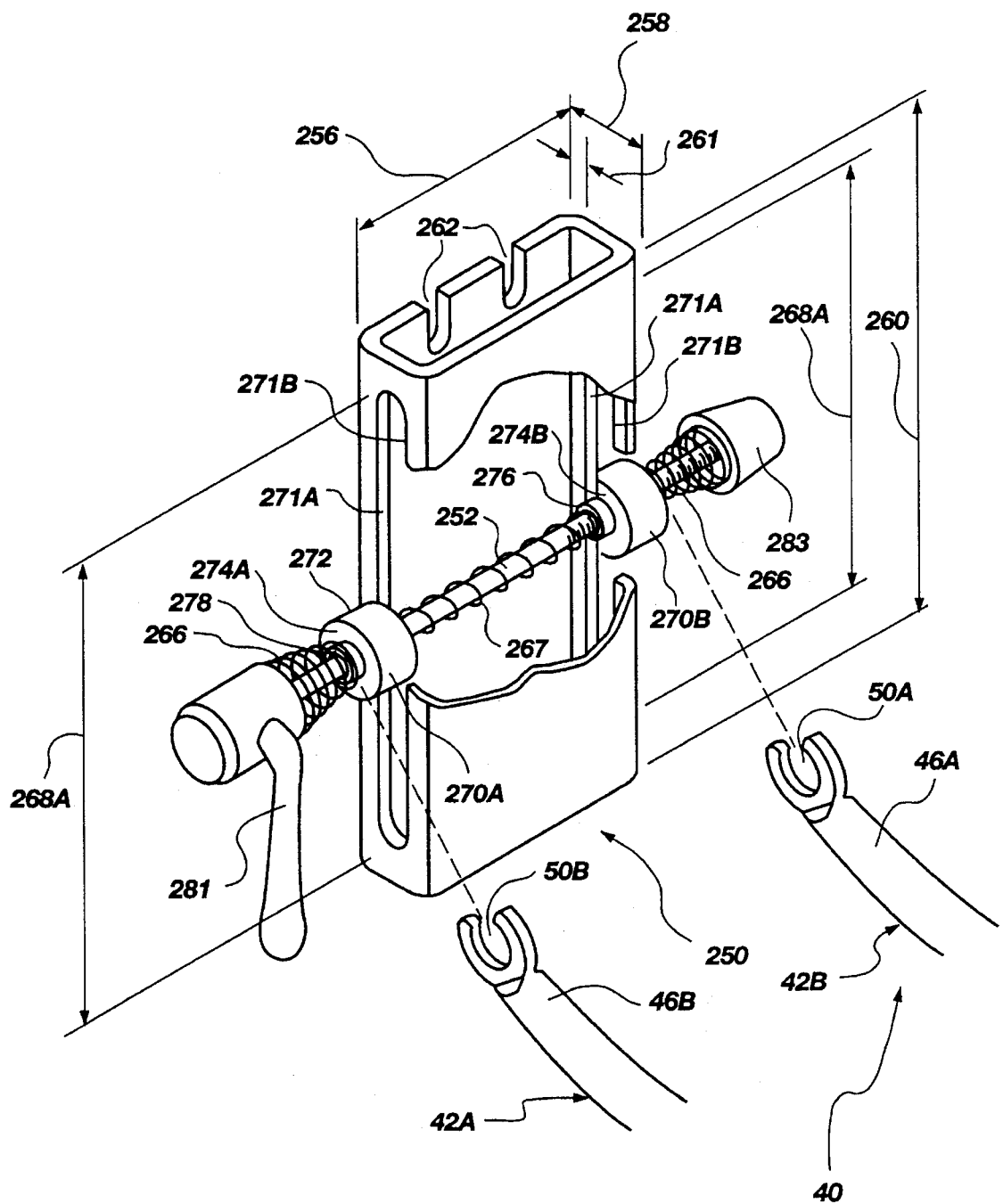
FIG. 6 is an isometric view of a detail of the fork mount of the apparatus of FIGS. 1–5.
Figure 7:
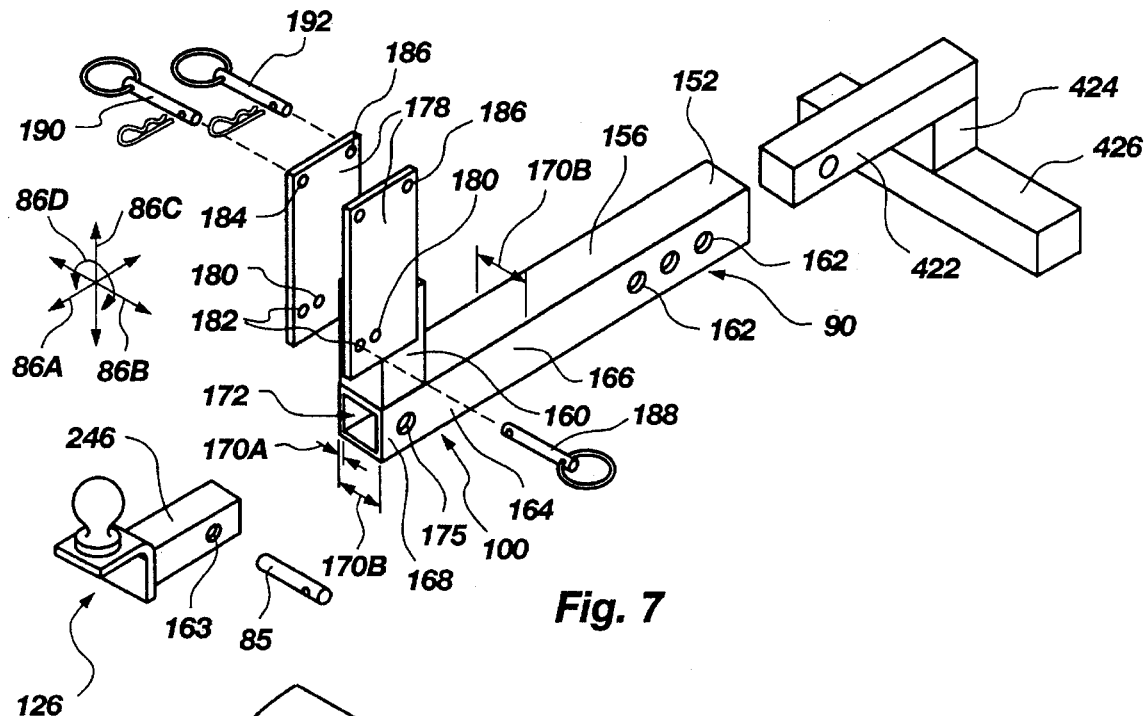
FIG. 7 is an isometric view of one embodiment of a base for the apparatus of FIG. 1.

As illustrated in FIGS. 2 and 5, the spacers 354A, 354B may be positioned together, or separated by the post 102, to offset the position of the tire yoke 116. If the spacers 354A, 354B are together, on the side 356A (longitudinally 86A) of the post 102, the tire yoke 116 may be moved longitudinally 86A away from the vehicle 12 by the length 358 of a spacer 354A, 354B. If the spacers 354A, 354B are positioned together on the side 356B of the post 102, the tire yoke 116 may be positioned toward the vehicle 12. If the spacers 354A, 354B are positioned on opposite sides 356A, 356B of the post 102, respectively, the tire yoke 116 may be centered with respect to the post 102. In one embodiment, three wheels 60 may be secured by tire yokes 116 on each side 356C, 356D (laterally) of the post with no offsetting required. Thus, six bicycles 16 may be carried by suitable sizing of the arm 109, tray 110, additional trays 112, and blocks 250. All the six wheels 60 may be carried on one post 102. With further offsetting, additional wheels 60 may be carried.

The axle 48 may be received into slots 360 in the bars 350A, 350B. The slots 360 may be oriented in any suitable direction. The slots 360 may be oriented as slots 361 (see e.g. FIG. 2) to partially extend across 351A the bar 350A, 350B, or axially 351B along the bar 350A, 350B near the end 362. In the former orientation, the axle 48 may be retained by the material of the bar 350A, 350B rather than just friction applied by nuts 49 of the axle 48. The tire 58 rests against the post 102 at the point of contact of the tire 58 on the post 102. The axle 48, the post 102, and the bolt 352 triangulate to support the weight of the wheel 60.

In one embodiment, the block 250 may be mounted near the end 204 of the post 102 for retaining the tines 42A, 42B of the fork 40, while a tire yoke 116 may be used as the support 108 to support the rear axle 69 of the bicycle 16. In this configuration, tire yokes 116 may be offset completely with both bars 350A, 350B on the same side 356A, or 356B of the post 102. Thus two bicycles 16 and their front wheels 60 may be carried on a single post 102 with no tray 110 required.

Referring to FIGS. 10 and 16–19, the apparatus 10 may be provided with a tightener 120, or tightening assembly 120, comprising a dog 370 attachable to the trunnion 90 or receiver 80 by a keeper 372. The dog 370 may have a cleat 374 for accommodating the difference in widths 81A, 91A of the receiver 80 and trunnion 90, respectively. A tensioner 376 may snub the dog against the receiver 80 and trunnion 90 by applying a force between the dog 370 and the keeper 372. A dog 370 may be fabricated from a suitably dimensioned piece of angle iron sized to support the force applied by the tensioner 376.

The keeper 372 may be formed from a U-bolt 380 with end nuts 381 attachable as tensioners 376. When the tensioners 376 are released enough to render the keeper 372 slidably loose on the trunnion 90, the tightening assembly 120 may be removed with the trunnion 90, and removed from the trunnion 90 or receiver 80 without dismantling the dog 370 from the keeper 372. Moreover, the dog 370 and keeper 372 may be sized to fit virtually all types of receivers 80 and trunnions 90, irrespective of manufacturer or application.

The dog 370 may be fitted to a 'U' bolt 380 acting as a keeper 372. The keeper 372 may thus not require any apertures or fixtures on the trunnion 80 or receiver 90. The tightening assembly 120 may thus be installed without altering the receiver 80 or trunnion 90. The tightening assembly 120 may also be oversized while still functioning properly. Thus, the keeper 372 may be universally applied to a variety of makes and sizes of receivers 80 and trunnions 90.

Figure 4:
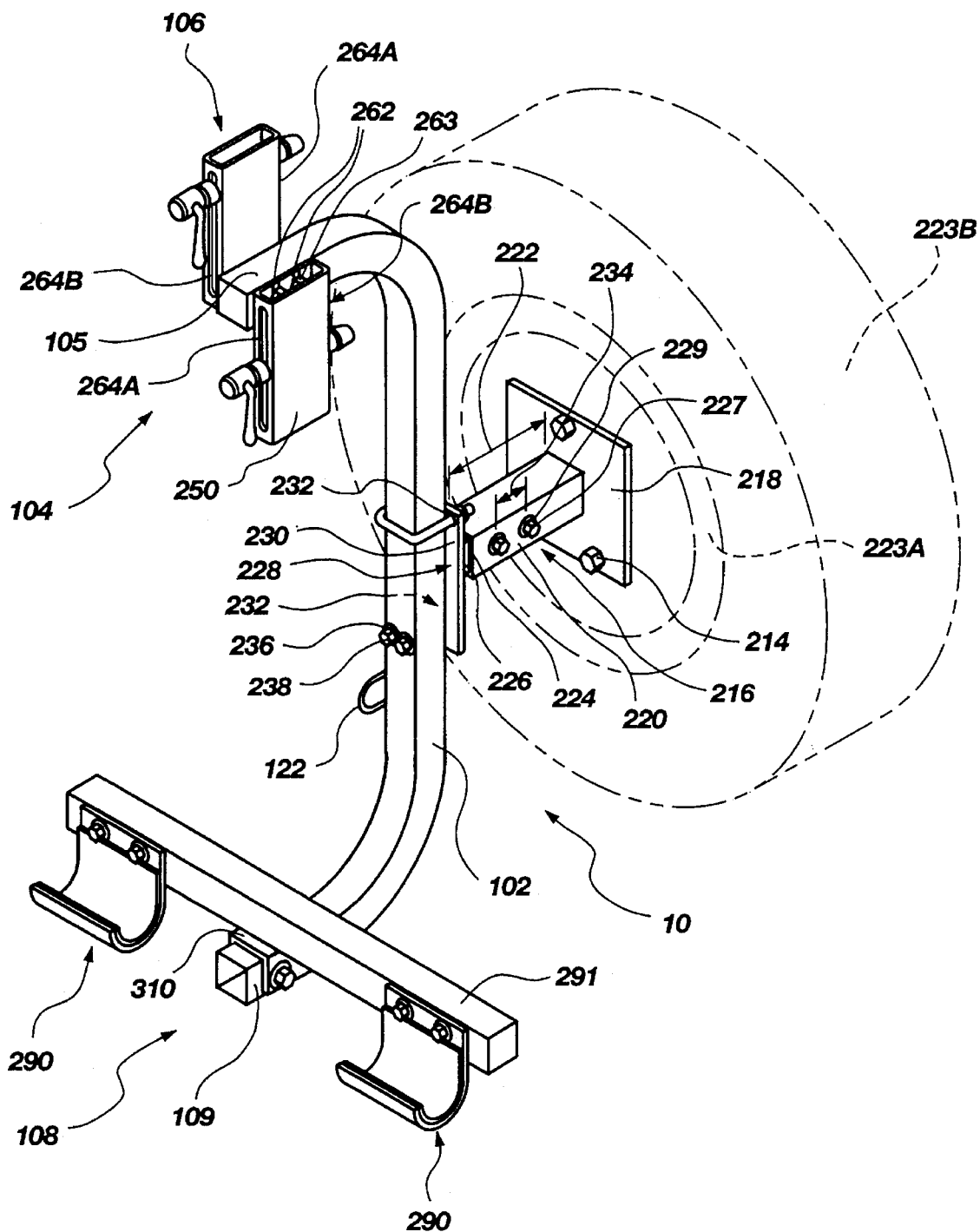
FIG. 4 is an isometric view of an alternative embodiment of an apparatus constructed in accordance with the invention to be attachable to a mount for a spare tire.
Figure 20:
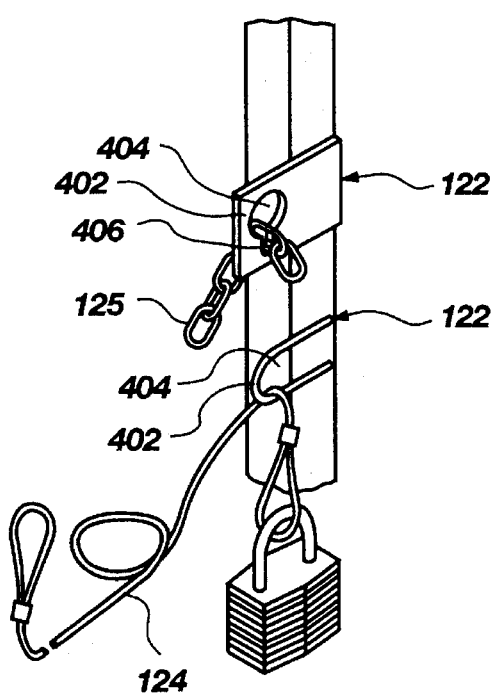
FIG. 20 is an isometric view of a detail of a lock anchor for the apparatus of FIGS. 1–5.

The keeper 372 and tensioner 376 may be embodied in a bolt 382, optionally having a knurled head 384 for connecting without tools. The dog 370 may be secured by the bolt 382 passing through the dog 370 and bolting to the trunnion 90 or receiver 80, directly. A shoulder 386 may be formed on any bolt 382 to space the knurled head 384 away from the dog 370 and to reduce friction therebetween to ease turning of the bolt 382. The trunnion 90 or receiver 80 may be provided with a threaded aperture 388 formed in the material of the trunnion or receiver 80, or of an attached nut (not shown) positioned therein to receive the bolt 382 of the tensioner 376, as appropriate. Referring to FIGS. 20 and 4–5, a lock anchor 122 (shown here in two alternative embodiments not intended to be used together may be attached to the post 102. The lock anchor 122 may comprise a loop 402 having an aperture 404 therein for receiving a flexible member such as a cable, chain, or the like threaded through each bicycle 16 attached to the apparatus 10. The aperture 404 may be provided with a chain slot 406 for retaining a link 408 of chain.

Alternatively, a security cable 124 having a length 410 sized to thread through the wheels, 60, 62 and frames 18 of the bicycles 16 may be secured to the loop 402 of the lock anchor 122. The security cable 124 may be provided with eyes 408A, 408B for receiving the hasp 410 of a lock 412. Should a bicycle 16 or wheel 60 work loose in transit, the security cable 124 may serve to prevent any loss or damage until the bicycle 16 can be safely re-secured.

A hitch 126 (see, e.g., FIG. 7) may be attached to the base 100 or to the arm 109 while the apparatus is being used to carry bicycles 16. The extension 246 of the hitch 126 may be fitted into the passage 172 of the base 100 or into the arm 109 of the support 108. The extension 246 may be pinned or otherwise secured in a manner similar or identical to the securement of the trunnion 90 in the receiver 80. The hitch 126, trunnion 90, base 100, arm 109, and extension 246 may each be sized and rated to a suitable capacity to optimize permissible loading and the desired weight of the apparatus 10.

A trunnion 422 may be insertable into a trunnion 90, arm 109 or base 100 to extend opposite the arm 109 from the post 102. The trunnion 422 may be provided with a leg 424 and foot 426, opposite the post 102 for resting evenly on a surface such as a floor. The leg 424 and foot 426 may also serve to level the apparatus 10 so that it serves as a bicycle rack in a garage, shop, basement or the like. Also, the leg 424 and foot 426 may be adapted to be wall mounted, providing the trunnion 422 as a wall mounting bracket for the apparatus 10 and bicycles 16. Thus, the apparatus 10 may serve for storage as well as for transit.

Figure 3:
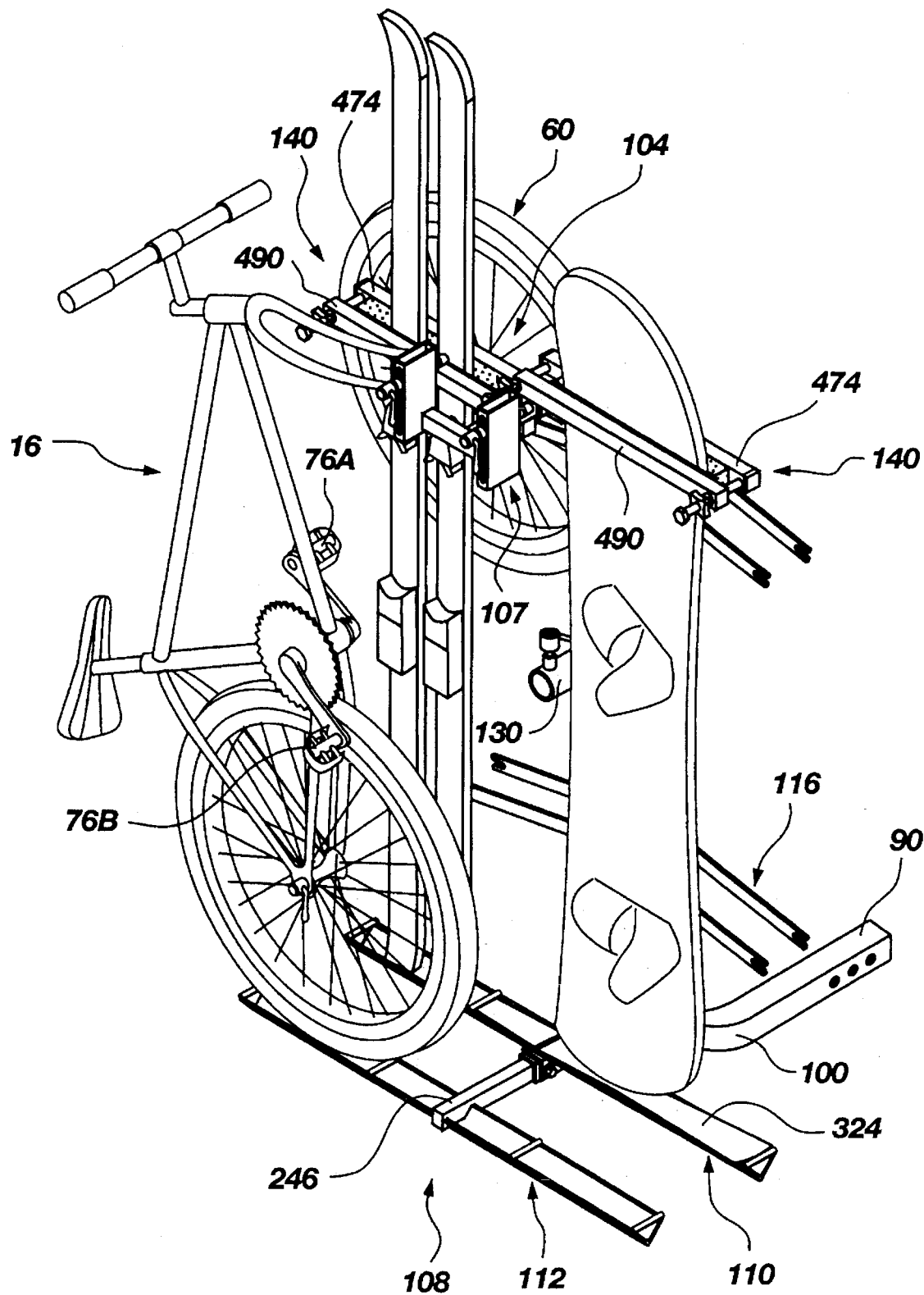
FIG. 3 is an isometric view of the apparatus of FIG. 1 adapted for carrying sporting equipment.

A vise mount 130 may be formed to attach to the post 102 for receiving a vise 128 as in, for example, FIGS. 1–3. A housing 450, having a length 451, may be attached at a proximal end 452A to the post 102, and may have a cavity 454 extending toward the proximal end from a distal end 452B to at least a stop 456. A set screw 458 penetrating the housing 450 at a position between the stop 456 and the distal end may be used to selectively secure and release a lug 459 on the vise 128. Release facilitates rotation or removal. Securement fixes the position of the vise 128. The length 451 may be selected to position the vise 128 clear of bicycles 16 on the apparatus 10. A crank 460 may conveniently be used to operate the set screw 458.

Figure 21:
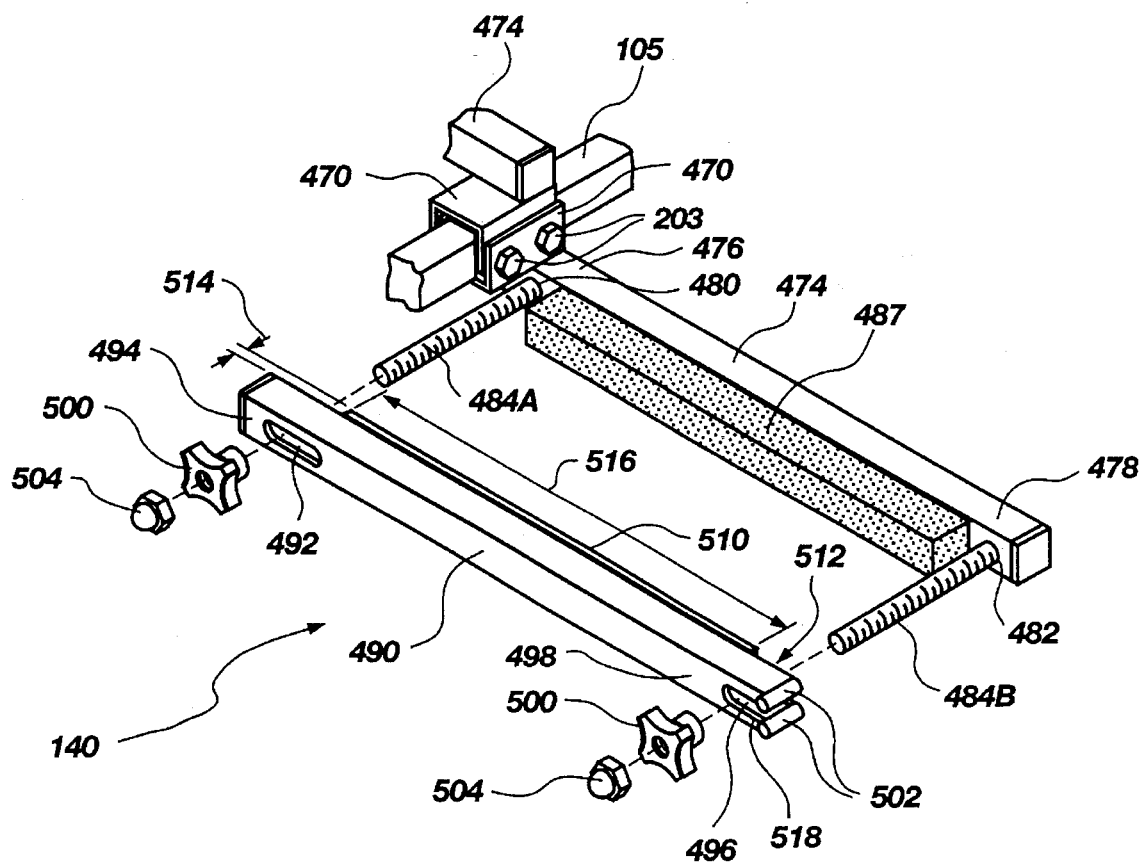
FIG. 21 is an isometric view of a detail of a wing of the apparatus of FIG. 3.

Referring to FIG. 21, and also FIG. 3, a wing 140 may be formed to attach to the arm 105 of the support 104 of the apparatus. The wing 140 may be comprised of a bracket 470 securable by bolts 263 at the universal spacing 234. The bracket 470 may be fastened to a bar 474 by suitable means such as welding or bolting. In one presently preferred embodiment, the bracket 470 may be made somewhat wider than the arm 105.

One bracket 470 may then be offset and interleaved with another bracket 470 as illustrated. In this embodiment, identical brackets 470 may be positioned 180 degrees from one another. Thus, a bracket 470 may be turned upside down, to present an identical wing 140 in an opposite orientation. When only a single wing 140 is desired, a block 250 (instead of another bracket 470) may be fitted between the remaining bracket 470 and the arm 105.

The bar 474 may extend from a first end 476 to a second end 478. An aperture 480 at the first end 476 may be round. An aperture 482 may be formed in the second end 478. Each aperture 480, 482 may be sized to receive a bolt 484A, 484B, such as a carriage bolt having a rectangular shank or underhead (not shown) for registering with the apertures 480, 482 when shaped to snugly fit. A pad 487 may be secured to extend along a surface 488 of the bar 474, for resiliently gripping athletic equipment resting against the bar 474.

A second bar 490 may be formed to have an aperture 492 in a first end 494, formed to be closed and slotted (elongated) in shape. An aperture 496 may be formed in a second end 498 to be open and slotted. The aperture 496 may be provided with braces 502 to support forces acting on the bar 490 at the aperture 496 where open.

Means to urge the bar 490 toward the bar 474 may be knobs 500 or the like. For example, the knobs 500 may be threaded onto the bolts 484A, 484B. The braces 502 may be secured to the bar 490 to support the force applied by the knobs 500 tightening on the bolts 484A, 484B.

The braces 502 may also extend away from the bar 490 a distance effective to prevent sliding by the bar 490 if loosened accidentally. A detent may be formed by the braces 502 or other structure extending away from the bar 490 to capture a knob 500. This arrangement may reduce the risk of the bar 490 falling away from the bar 474 in transit.

Springs (not shown), such as Belville washers, coil springs, elastomeric washers, or the like, may be provided between the knobs 500 and the bar 490. The deflection of such springs may be adjusted to regulate tension between the knobs 500 and the bars 474, 490.

The bolts 484A, 484B may be formed of threaded rod, partially threaded rod or the like. In one presently preferred embodiment, the bolts 484A, 484B may be carriage bolts, and may have stops 504 secured to prevent the knobs 500 from being rotated off the bolts 484A, 484B. Registration of the bolts 484A, 484B in the apertures 480, 482 may resist rotation of the bolts 484A, 484B. Elimination or reduction of rotation reduces the need for tools and hands to close the bar 490 toward the bar 474. Registration may also be accomplished by forming any means for fixing the bolt 484A, 484B with respect to the bar 474, such as by shaping a shank, welding, gripping, hooking, splining, gluing, or bending the bolt 484A, 484B, or the like, to inhibit rotation of the bolt 484A, 484B.

The bar 490 may also have a resilient pad 510 secured to a surface 512 opposite the pad 487 on the bar 474. The thickness 514 and length 516 of the pad 510 may be selected to firmly secure selected athletic equipment without damage during transit.

In operation, the knobs 500 may be rotated to release all tension, and to move away from the bar 490. The bar 490 may be made slidable toward the first end. The aperture 492 may be elongated to slidably capture a bolt 484A, permitting the bar 490 to slide sufficiently to move the detent 518 of the aperture 496 past its associated bolt 484B. The detent 518 may be a ridge or lip to inhibit sliding of the bar 490 with respect to the bar 474 in the event that one of the knobs 500 accidentally becomes slightly loosened. As the end 498 clears the bolt 484B nearest it, the end 498 may drop, the bar 490 pivoting about the other end 494. The bar 474 may then be exposed. Skis, boards, poles or other athletic equipment may then be placed against the pad 487, with one end of the equipment resting on the pad 324 in the tray 110, 112.

After placement of the equipment against the pad 487, the bar 490 may be pivoted about the end 476 into alignment with the bar 474. The bar 490 may then be moved toward the bolt 484B, capturing the bolt 484B in the aperture 496. The knobs 500 may then be rotated on the bolts 484A, 484B to snub the equipment between the pads 487, 510, the thickness 514 of the pad 510 conforming to the shape of the equipment.

A cargo rack 138 may be constructed to be secured to the base 100, support 108, arm 109, or the like. In one presently preferred embodiment, for example, an extension 246 may be fitted and pinned to the base 100 in place of the extension 246 of the hitch 126, and may likewise be shimmed. The extension 246 may extend to a base 524 supporting a frame 526 over which extends a deck 528. Risers 530 may extend from the frame 526 to support a railing 532 that may be similar or identical to the frame 526.

Attached to the frame 526 may be stabilizers 536. The stabilizers 536 may extend to the support 108. For example, the stabilizers may be formed to rest on the trays 110, 112 to reduce wobbling of the cargo rack 138. The stabilizer 536 may be made conformal with the tray 110 to make firm contact, for example, to stabilize the cargo rack 138 in any direction 86A, 86B, 86C, 86D.

In operation, the apparatus 10 may be installed on a vehicle 12 by placing the trunnion 90 into a receiver 80 secured to the vehicle 12. A pin 84 may be inserted into the aperture 174 to secure the trunnion 90 to the receiver 80.

A user may remove the front wheel 60 of the bicycle 16 by releasing the axle 48. The user then lifts the bicycle 16 to rest the rear tire on the tray 110, between the braces 318 to resist rolling. The head tube 24 and handlebars 42 may be lifted with the fork 40, pivoting about the rear wheel 62 toward the arm 105. The tines 42A, 42B may be positioned with the axle slots 50A, 50B receiving the skewer 252. The skewer 252 may then be secured at a position along the ways 271A, 271B by levering the cam lock 280. The rear wheel 62 may be strapped to the tray 110, or otherwise secured against bouncing, rolling or otherwise shifting in transit.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for carrying a bicycle, having a fork, on a vehicle having a receiver and having substantially orthogonal longitudinal, lateral, and transverse directions, transverse to include upward and downward, the apparatus comprising:

a trunnion securable to the receiver to extend longitudinally;

a post connected proximate one end thereof to the trunnion to extend transversely away therefrom to another end;

a first support attached to the post proximate the one end to receive the bicycle oriented with the fork extending laterally; and a second support attached proximate the other end of the post for selectively securing the bicycle to the apparatus.

2. The apparatus of claim 1 further comprising a pivot connecting the trunnion and the post to selectively position the post away from the vehicle.

3. The apparatus of claim 2 wherein the pivot further comprises a pin passing through a base attached to the trunnion, and through a sleeve attached to the post, the base being adapted to receive the pin at a plurality of positions for selectively positioning the pin to orient the post.

4. The apparatus of claim 1 adapted to support a plurality of bicycles, and wherein the first and second supports are provided with first and second extensions, respectively, secured to displace a second bicycle of the plurality of bicycles away from the bicycle in the longitudinal direction, and at least one other direction selected from the group consisting of the lateral and transverse directions.

5. The apparatus of claim 1 further comprising a base for offsetting the post away from an end of the trunnion, the trunnion being adapted to receive an extension proximate the end thereof.

6. The apparatus of claim 1 wherein the first support comprises an arm extending longitudinally away from the post for supporting the bicycle.

7. The apparatus of claim 1 wherein the first support comprises a tray for supporting a wheel of the bicycle.

8. The apparatus of claim 1 wherein the first support comprises a plurality of trays, a tray of the plurality of trays being offset transversely from an adjacent tray of the plurality of trays.

9. The apparatus of claim 1 wherein the second support comprises an arm extending longitudinally away from the post and adapted to receive the fork.

10. The apparatus of claim 1 wherein the second support comprises a block, with a skewer selectively positionable along the block for receiving tines of the fork.

11. The apparatus of claim 1 wherein the second support comprises a block for securing the fork, the block being selectively positionable to adapt to the length of the bicycle.

12. The apparatus of claim 1 adapted to support a plurality of bicycles each having a fork comprised of times, and wherein the second support comprises an arm supporting a plurality of blocks, each block being adapted to receive the times of a bicycle of the plurality of bicycles, and each block of the plurality of blocks being offset laterally from an adjacent block of the plurality of blocks.

13. The apparatus of claim 1 further comprising a yoke attached to the post and adapted to receive an axle of a wheel of the bicycle for supporting the wheel.

14. The apparatus of claim 1 wherein the first support and second support further comprise means for securing a plurality of bicycles in pairs, each bicycle of a pair being oriented in a mirror image position with respect to the other bicycle in the pair.

15. The apparatus of claim 1 further comprising an extension attachable to extend longitudinally away from the post for supporting a plurality of bicycles spaced longitudinally away from the post.

16. The apparatus of claim 1 further including a base adapted to support a cargo rack extending away from the base and the trunnion.

17. The apparatus of claim 1 further comprising a dog, positionable to be slidably removable from the trunnion, and a keeper attached to the dog, the dog being adapted to extend longitudinally across the trunnion and the receiver, and the keeper being provided with a tensioner for drawing together the keeper, the dog, the trunnion and the receiver for reducing relative motion therebetween.

18. An apparatus for carrying a bicycle, having a fork on a vehicle having a receiver and having substantially orthogonal longitudinal, lateral, and transverse directions, transverse to include upward and downward, the apparatus comprising:
- a trunnion securable to the receiver to extend longitudinally;
- a post connected proximate one end thereof to the trunnion to extend transversely away therefrom to another end;
- a first support attached to the post proximate the one end to receive the bicycle oriented with the fork extending laterally;
- a second support attached proximate the other end of the post for selectively securing the bicycle to the apparatus; and
- the second support further comprising wings extending laterally and adapted to secure elongate objects extending transversely between the first support and second support.

19. An apparatus for carrying a bicycle on a vehicle having a longitudinal direction, a lateral direction, and an upward direction, substantially orthogonal to one another, the bicycle having a fork, a seat tube, and a wheel the apparatus comprising:
- a base securable to the vehicle;
- a post secured proximate one end thereof to the base to extend upwardly away therefrom to another end;
- a first support attached to the post proximate the one end for selectively supporting the bicycle oriented with the seat tube extending laterally; and
- a second support attached proximate the other end of the post and adaptable to secure the bicycle against movement in the lateral, longitudinal, and upward directions.

20. The apparatus of claim 19 wherein the first support comprises an arm extending longitudinally away from the post and the second support comprises an arm extending longitudinally away from the post for receiving and supporting the fork.

21. The apparatus of claim 20 wherein the first support comprises a tray for supporting a wheel of the bicycle.

22. The apparatus of claim 21 wherein the first support comprises a plurality of trays, a tray of the plurality of trays being offset transversely from an adjacent tray of the plurality of trays.

23. The apparatus of claim 22 wherein the second support comprises a block selectively positionable to adapt to the bicycle and a skewer selectively positionable along the block core receiving the fork.

24. The apparatus of claim 23 further comprising a yoke attached to the post and adapted to receive an axle of a wheel of the bicycle for supporting the wheel.

25. The apparatus of claim 24 further comprising a pivot connected between the trunnion and the post for selectively pivoting the other end of the post away from the vehicle.

26. The apparatus of claim 25 wherein the base is adapted to receive a pin at one of a plurality of positions for selectively positioning the pin to adjust an angle between the post and the vehicle.

27. The apparatus of claim 26 wherein the first support and second support further comprise means for securing a plurality of bicycles in pairs, each bicycle of a pair being oriented in a mirror image position with respect to the other bicycle in the pair.

28. The apparatus of claim 27 wherein the second support is adaptable to include bars extending laterally for receiving elongate objects extending upwardly between the first support and second support.

29. The apparatus of claim 28 further including a dog, a keeper attached to the dog, and a tensioner attached to the keeper to draw together the keeper, the dog, the trunnion and the receiver for reducing relative motion therebetween.

30. An apparatus for carrying a bicycle on a vehicle having a longitudinal direction associated with the vehicle's travel, with a lateral and a transverse direction extending orthogonal thereto and to one another, the transverse direction including upward and downward directions, the bicycle including a fork pivotably connected at one end of a frame, a front wheel selectively attachable and removable from a distal end of the fork, and a rear wheel rotatably connected to the other end of the frame, the apparatus comprising:
- a base attachable to the vehicle;
- a post secured to the base to extend transversely away therefrom;
- a first arm secured proximate a proximal end of the post to support the bicycle; and
- a second arm secured proximate a distal end of the post and adapted to receive the distal end, the fork extending laterally away from the second arm.

31. The apparatus of claim 30 further comprising a mechanism adapted to reduce motion between a receiver attached to the vehicle and a trunnion secured to the receiver to support the base, the mechanism comprising:
- a dog positioned to engage the trunnion and the receiver on a single side thereof, and having a cleat accommodating a difference in sizes of the receiver and trunnion;
- a keeper extending from the dog to engage the trunnion, the keeper being slidably removable from the trunnion upon removal of the trunnion from the receiver;
- a tensioner secured to the keeper and positioned to selectively urge the dog, the trunnion, and the receiver together.

* * * * *

UNITED STATES PATENT AND TRADEMARK OFFICE
CERTIFICATE OF CORRECTION

PATENT NO. : 5,579,972
DATED : December 3, 1993
INVENTOR(S) : Steven S. Despain

It is certified that error appears in the above-indentified patent and that said Letters Patent is hereby corrected as shown below:

In column 1, line 33, please change "rack" to -- racks --.

In column 6, line 27, please change "6B" to -- 86B --.

In column 8, line 44, please change "10" to -- 102 --.

In column 15, line 21, after "together" please add -- ) -- (a punctuation right parenthesis).

Signed and Sealed this

Twenty-seventh Day of May, 1997

Attest:

BRUCE LEHMAN

Attesting Officer

Commissioner of Patents and Trademarks